(12) United States Patent
Sim et al.

(10) Patent No.: US 11,910,023 B2
(45) Date of Patent: *Feb. 20, 2024

(54) METHOD AND APPARATUS FOR PARALLEL ENCODING AND DECODING OF MOVING PICTURE DATA

(71) Applicants: Hyundai Motor Company, Seoul (KR); Kia Corporation, Seoul (KR); Kwangwoon University Industry-Academic Collaboration Foundation, Seoul (KR)

(72) Inventors: Dong Gyu Sim, Seoul (KR); Sea Nae Park, Seoul (KR); Joo Hyung Byeon, Seoul (KR); Seung Wook Park, Gyeonggi-do (KR); Wha Pyeong Lim, Gyeonggi-do (KR)

(73) Assignees: Hyundai Motor Company, Seoul (KR); Kia Corporation, Seoul (KR); Kwangwoon University Industry-Academic Collaboration Foundation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/078,986

(22) Filed: Dec. 11, 2022

(65) Prior Publication Data

US 2023/0113442 A1 Apr. 13, 2023

Related U.S. Application Data

(63) Continuation of application No. 17/277,936, filed as application No. PCT/KR2020/006424 on May 15, 2020, now Pat. No. 11,553,209.

(30) Foreign Application Priority Data

May 15, 2019 (KR) .................. 10-2019-0056975
Sep. 30, 2019 (KR) .................. 10-2019-0120806
May 15, 2020 (KR) .................. 10-2020-0058318

(51) Int. Cl.
*H04N 19/70* (2014.01)
*H04N 19/176* (2014.01)
(Continued)

(52) U.S. Cl.
CPC .......... *H04N 19/70* (2014.11); *H04N 19/132* (2014.11); *H04N 19/176* (2014.11); *H04N 19/1883* (2014.11); *H04N 19/46* (2014.11)

(58) Field of Classification Search
CPC .... H04N 19/70; H04N 19/132; H04N 19/176; H04N 19/1883; H04N 19/46
(Continued)

(56) References Cited

U.S. PATENT DOCUMENTS 9,930,368 B2  3/2018  Schierl et al.
10,257,529 B2  4/2019  Rhee et al.
(Continued)

FOREIGN PATENT DOCUMENTS

KR  10-2017-0002512 A  1/2017
KR  10-2017-0008285 A  1/2017
(Continued)

OTHER PUBLICATIONS

T. Ikai, "AHG12: One CTU delay wavefront parallel processing", JVET-N0150, (2019) 7 pages.
(Continued)

*Primary Examiner* — Albert Kir
(74) *Attorney, Agent, or Firm* — Fox Rothschild LLP

(57) ABSTRACT

A method and an apparatus for parallel encoding and decoding of moving picture data are provided. The method includes decoding, from a bitstream, a syntax element indicating that a picture can be decoded using wavefront parallel processing and decoding encoded data of the pic-
(Continued)

ture. The step of decoding encoded data of the picture includes for a first coding block of a current CTU row encoded in a palette mode, predicting a palette table for the first coding block by using palette data from a first CTU of a previous CTU row and decoding the first coding block in the palette mode using the palette table predicted for the first coding block.

3 Claims, 15 Drawing Sheets

(51) Int. Cl.
  *H04N 19/132* (2014.01)
  *H04N 19/169* (2014.01)
  *H04N 19/46* (2014.01)
(58) Field of Classification Search
  USPC .................................................. 375/240.26
  See application file for complete search history.

(56) References Cited

U.S. PATENT DOCUMENTS

| | | | |
|---|---|---|---|
| 10,291,940 B2 | 5/2019 | Seregin et al. | |
| 10,484,713 B2* | 11/2019 | Lee | H04N 19/593 |
| 2015/0341656 A1* | 11/2015 | Seregin | H04N 19/157 |
| | | | 375/240.12 |
| 2016/0094852 A1* | 3/2016 | Joshi | H04N 19/93 |
| | | | 375/240.24 |
| 2017/0238001 A1 | 8/2017 | Li et al. | |
| 2020/0260107 A1* | 8/2020 | Han | H04N 19/96 |
| 2020/0304828 A1* | 9/2020 | Huang | H04N 19/42 |
| 2021/0368164 A1* | 11/2021 | Xu | H04N 19/593 |

FOREIGN PATENT DOCUMENTS

| | | |
|---|---|---|
| KR | 10-2017-0063885 A | 6/2017 |
| KR | 10-2018-0059571 A | 6/2018 |

OTHER PUBLICATIONS

Office Action for Indian Patent Application No. 202117058018 by Intellectual Property India Patent Office, dated Jun. 24, 2022, 8 pages.

* cited by examiner

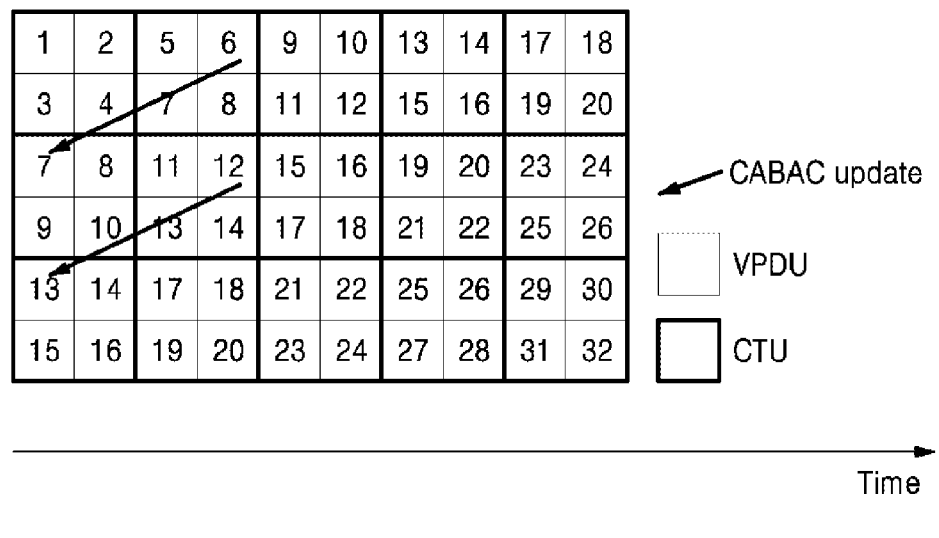
*FIG. 6*
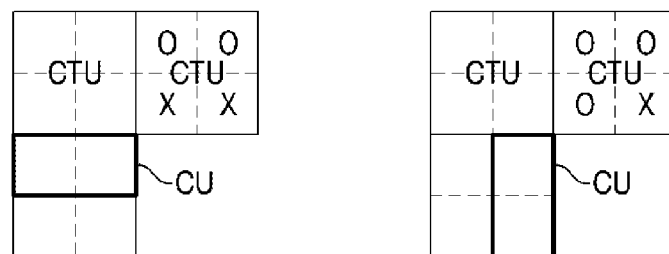
*FIG. 7A*    *FIG. 7B*

METHOD AND APPARATUS FOR PARALLEL ENCODING AND DECODING OF MOVING PICTURE DATA

CROSS-REFERENCE TO RELATED APPLICATION

This Application is a Continuation of application Ser. No. 17/277,936 filed on Mar. 19, 2021.

Application Ser. No. 17/277,936 is a National Phase application filed under 35 USC 371 of PCT International Application No. PCT/KR2020/006424, with an International Filing Date of May 15, 2020, which claims priority to Korean Patent Application No. 10-2020-0058318 filed on May 15, 2020, Korean Patent Application No. 10-2019-0120806 filed on Sep. 30, 2019, and Korean Patent Application No. 10-2019-0056975 filed on May 15, 2019, which are incorporated herein by reference in their entirety.

TECHNICAL FIELD

The present disclosure relates to encoding and decoding of video data, and more particularly, to a method and apparatus for performing encoding or decoding of video data in parallel.

BACKGROUND

Since the volume of video data is greater than that of voice data or still image data, storing or transmitting video data without processing for compression requires a lot of hardware resources including memory. Accordingly, in storing or transmitting video data, the video data is generally compressed using an encoder so as to be stored or transmitted.

Then, a decoder receives the compressed video data, and decompresses and reproduces the video data. Compression techniques for such video include H.264/AVC and High Efficiency Video Coding (HEVC), which improves coding efficiency over H.264/AVC by about 40%. However, the picture size, resolution, and frame rate are gradually increasing, and accordingly the amount of data to be encoded is also increasing. Accordingly, a new compression technique having better encoding efficiency and higher image quality than the existing compression technique is required.

SUMMARY

The present disclosure presents a method and apparatus for parallel processing of encoding or decoding of video data. In particular, the present disclosure presents techniques for supporting improved wavefront parallel processing that minimizes degradation of coding efficiency while having a low latency time.

In accordance with one aspect of the present disclosure, a method of encoding video data is provided that includes encoding, in a bitstream, a syntax element indicating that a picture can be encoded and decoded using wavefront parallel processing, and encoding data of the picture to enable decoding using the wavefront parallel processing. The encoding of the data of the picture includes predicting, for a first coding block of a current CTU row encoded in a palette mode, a palette table for the first coding block using palette data from a first CTU of a previous CTU row, and encoding the first coding block in the palette mode using the palette table predicted for the first coding block.

In accordance with another aspect of the present disclosure, a method of decoding video data is provided that includes decoding, from a bitstream, a syntax element indicating that a picture can be decoded using wavefront parallel processing, and decoding encoded data of the picture. The decoding of the encoded data of the picture includes predicting, for a first coding block of a current CTU row encoded in a palette mode, a palette table for the first coding block using palette data from a first CTU of a previous CTU row, and decoding the first coding block in the palette mode using the palette table predicted for the first coding block.

In accordance with another aspect of the present disclosure, an apparatus for encoding video data is provided that includes a memory, and one or more processors. The one or more processors are configured to encode a syntax element indicating that a picture can be encoded and decoded using wavefront parallel processing, and encode data of the picture to enable decoding using the wavefront parallel processing. As part of the encoding of the data of the picture, the one or more processors are configured to predict, for a first coding block of a current CTU row encoded in a palette mode, a palette table for the first coding block using palette data from a first CTU of a previous CTU row, and encode the first coding block in the palette mode using the palette table predicted for the first coding block.

In accordance with another aspect of the present disclosure, an apparatus for decoding video data is provided that includes a memory, and one or more processors. The one or more processors are configured to decode, from a bitstream, a syntax element indicating that a picture may be decoded using wavefront parallel processing, and to decode encoded data of the picture. As part of the decoding of the encoded data of the picture, the one or more processors predict, for a first coding block of a current CTU row encoded in a palette mode, a palette table for the first coding block using palette data from a first CTU of a previous CTU row, and decode the first coding block in the palette mode using the palette table predicted for the first coding block.

DESCRIPTION OF DRAWINGS

FIG. 6 is a conceptual diagram illustrating a wavefront parallel encoding and decoding scheme of a 1.5-CTU (6-VPDU) delay structure according to an aspect of the present disclosure.

FIGS. 7A-7B are diagrams illustrating a restriction imposed on an intra prediction mode or an intra block copy mode when a current block is larger than the size of a VPDU in the 1.5-CTU (6-VPDU) delay structure.

DETAILED DESCRIPTION

Figure 1:
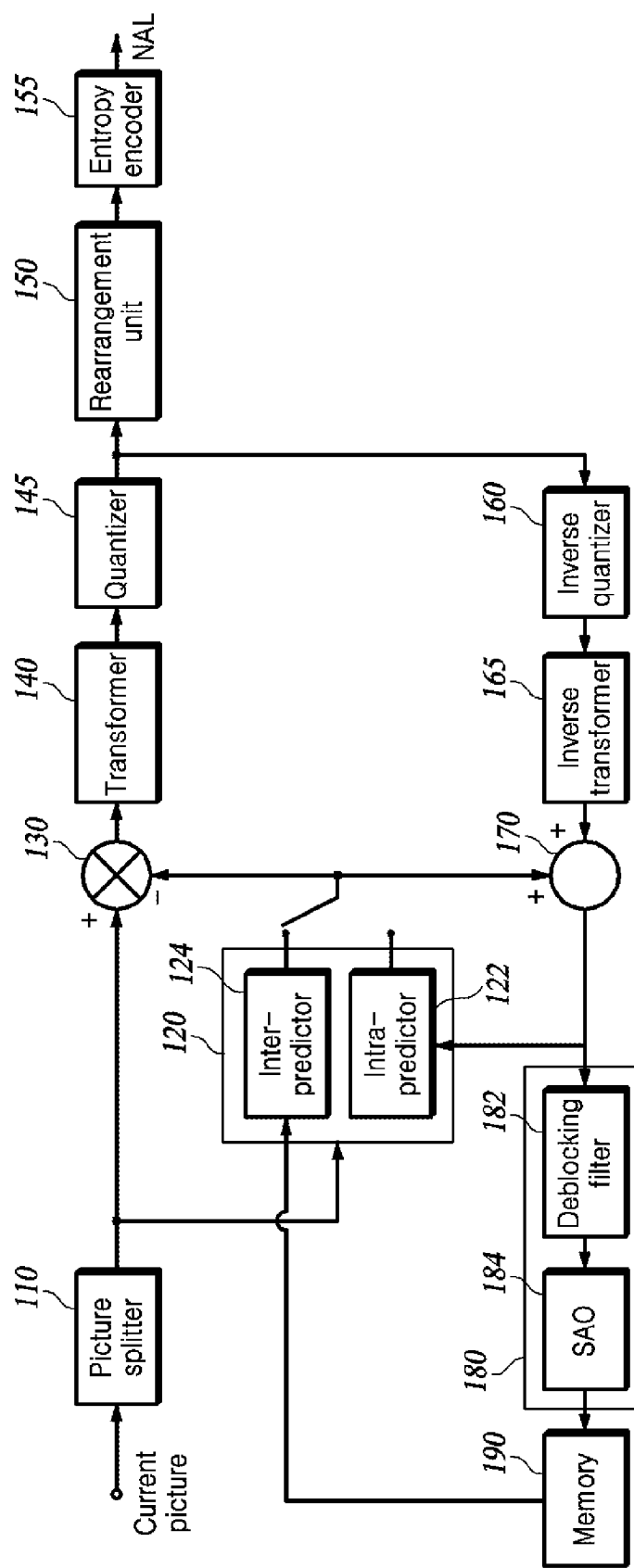
FIG. 1 is an exemplary block diagram of a video encoding apparatus capable of implementing the techniques of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus includes a picture splitter 110, a predictor 120, a subtractor 130, a transformer 140, a quantizer 145, a rearrangement unit 150, an entropy encoder 155, an inverse quantizer 160, an inverse transformer 165, an adder 170, a filter unit 180, and a memory 190. Each element of the video encoding apparatus may be implemented in hardware or software, or a combination of hardware and software. The functions of the respective elements may be implemented as software, and a microprocessor may be implemented to execute the software functions corresponding to the respective elements.

In particular, one video includes a plurality of pictures. Each picture is split into a plurality of regions, and encoding is performed on each region. For example, one picture is split into one or more tiles or/and slices. Here, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one slice in common is encoded as a syntax of a slice header, and information applied to all blocks constituting a picture is encoded in a picture parameter set (PPS) or a picture header. Furthermore, information which a plurality of pictures refers to in common is encoded in a sequence parameter set (SPS). In addition, information referred to by one or more SPSs in common is encoded in a video parameter set (VPS). Information applied to one tile or tile group in common may be encoded as a syntax of a tile or tile group header.

The picture splitter 110 is configured to determine the size of a coding tree unit (CTU). Information about the size of the CTU (cru size) is encoded as a syntax of the SPS or PPS and is transmitted to the video decoding apparatus. The picture splitter 110 is configured to split each picture constituting the video into a plurality of CTUs having a predetermined size, and then recursively split the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) of the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QuadTree plus BinaryTree (QTBT) structure may be used, or a QuadTree plus BinaryTree TernaryTree (QTBTTT) structure may be used. In particular, BTTT may be collectively referred to as a multiple-type tree (MTT).

Figure 2:
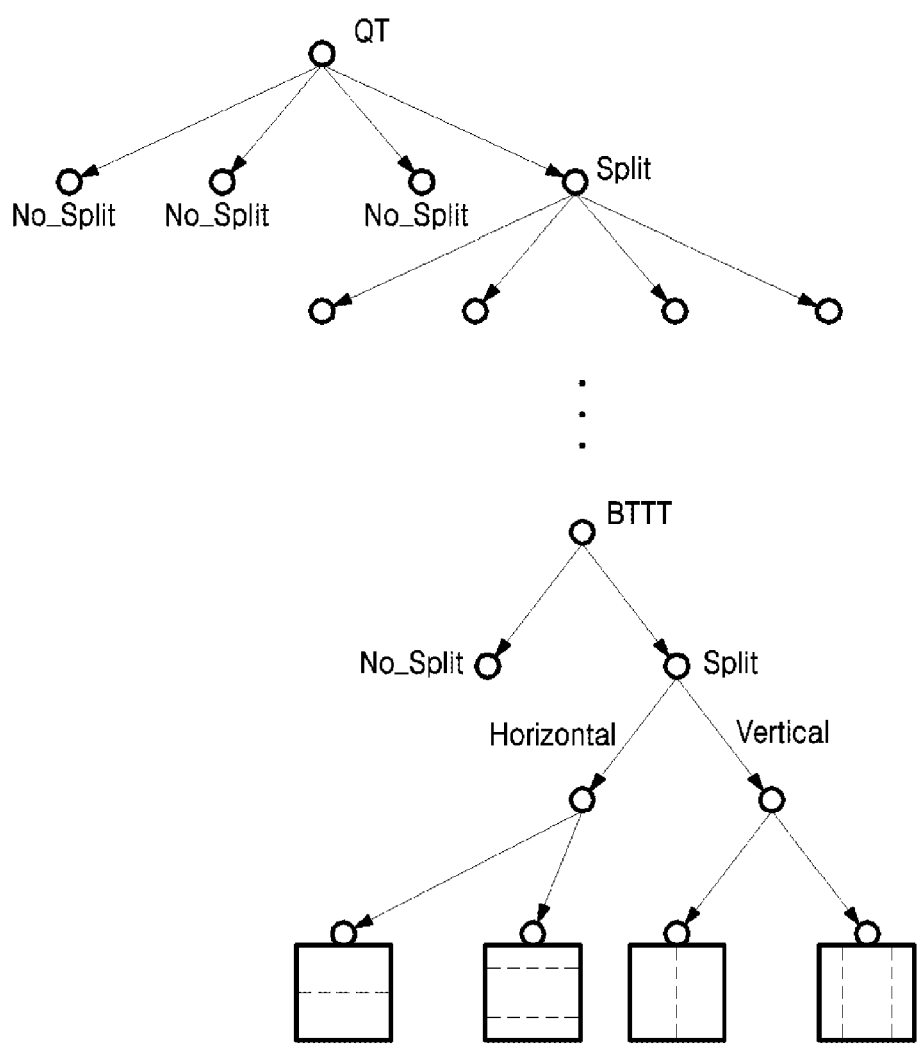
FIG. 2 exemplarily shows block partitioning structure using a QTBTTT structure.

FIG. 2 exemplarily shows a QTBTTT splitting tree structure. As shown in FIG. 2, a CTU may be initially split in the QT structure. The QT splitting may be repeated until the size of the splitting block reaches the minimum block size MinQTSize of a leaf node allowed in the QT. A first flag (QT_split_flag) indicating whether each node of the QT structure is split into four nodes of a lower layer is encoded by the entropy encoder 155 and signaled to the video decoding apparatus. When the leaf node of the QT is less than the maximum block size (MaxBTSize) of the root node allowed in the BT, it may be further split into one or more of the BT structure or the TT structure. The BT structure and/or the TT structure may have a plurality of splitting directions. For example, there may be two directions, namely, a direction in which a block of a node is horizontally split and a direction in which the block is vertically split.

As shown in FIG. 2, when MTT splitting is started, a second flag (mtt_split_flag) indicating whether nodes are split, a flag indicating a splitting direction (vertical or horizontal) in the case of splitting, and/or a flag indicating a splitting type (Binary or Ternary) are encoded by the entropy encoder 155 and signaled to the video decoding apparatus. Alternatively, prior to encoding the first flag (QT_split_flag) indicating whether each node is split into 4 nodes of a lower layer, a CU splitting flag (split_cu_flag) indicating whether the node is split may be encoded. When the value of the CU split flag (split_cu_flag) indicates that splitting is not performed, the block of the node becomes a leaf node in the splitting tree structure and serves a coding unit (CU), which is a basic unit of encoding. When the value of the CU split flag (split_cu_flag) indicates that splitting is performed, the video encoding apparatus is configured to start encoding the flags in the manner described above, starting with the first flag.

When QTBT is used as another example of a tree structure, there may be two splitting types, which are a type of horizontally splitting a block into two blocks of the same size (i.e., symmetric horizontal splitting) and a type of vertically splitting a block into two blocks of the same size (i.e., symmetric vertical splitting). A split flag (split_flag) indicating whether each node of the BT structure is split into block of a lower layer and splitting type information indicating the splitting type are encoded by the entropy encoder 155 and transmitted to the video decoding apparatus. There may be an additional type of splitting a block of a node into two asymmetric blocks. The asymmetric splitting type may include a type of splitting a block into two rectangular blocks at a size ratio of 1:3, or a type of diagonally splitting a block of a node.

Particularly, CUs may have various sizes according to QTBT or QTBTTT splitting of a CTU. Hereinafter, a block corresponding to a CU (i.e., a leaf node of QTBTTT) to be encoded or decoded is referred to as a "current block". As QTBTTT splitting is employed, the shape of the current block may be square or rectangular. The predictor 120 is configured to predict the current block to generate a prediction block. The predictor 120 includes an intra-predictor 122 and an inter-predictor 124. In general, each of the current blocks in a picture may be predictively coded. Additionally, prediction of a current block is performed using an intra-prediction technique (using data from a picture containing the current block) or an inter-prediction technique (using data from a picture coded before a picture containing the current block). The inter-prediction includes both unidirectional prediction and bi-directional prediction.

Figure 3A:
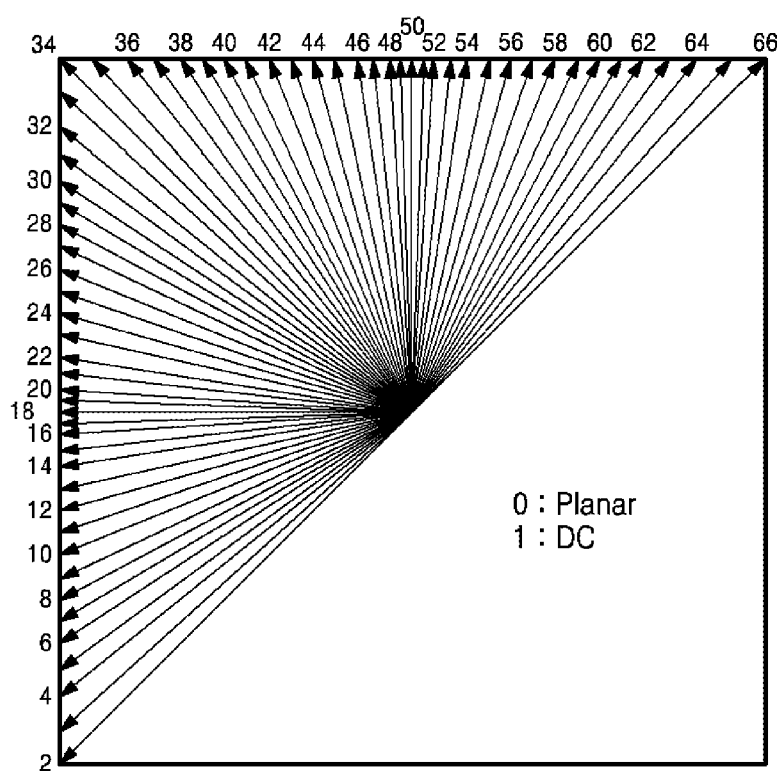
FIG. 3A exemplarily shows a plurality of intra-prediction modes.
Figure 3B:
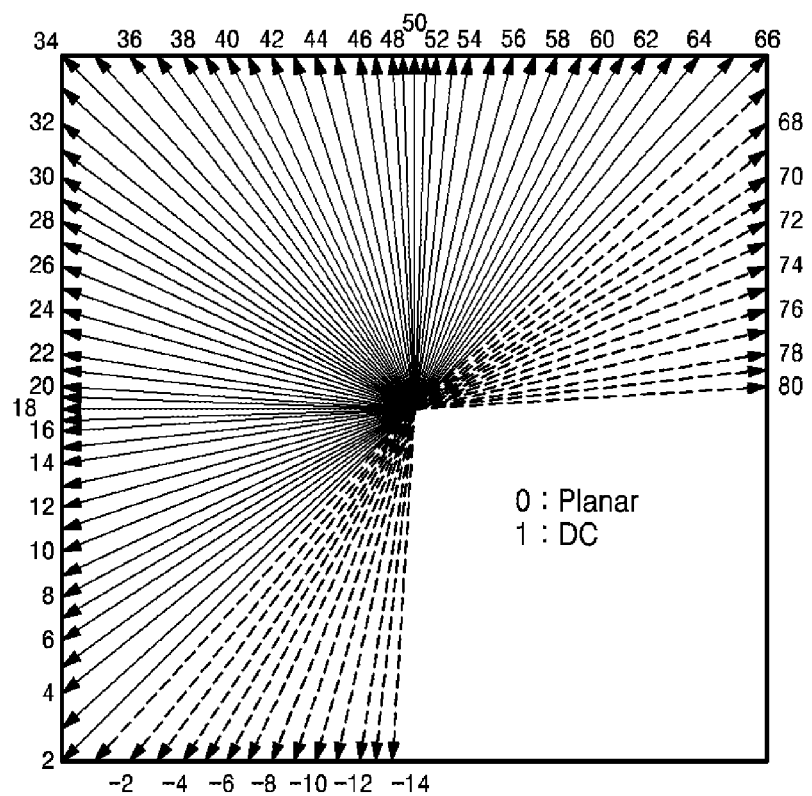
FIG. 3B exemplarily shows a plurality of intra prediction modes including wide-angle intra prediction modes.

The intra-prediction unit 122 is configured to predict pixels in the current block using pixels (reference pixels) positioned around the current block in the current picture including the current block. There is a plurality of intra-prediction modes according to the prediction directions. For example, as shown in FIGS. 3A-3B, the plurality of intra-prediction modes may include two non-directional modes, which include a planar mode and a DC mode, and 65 directional modes. Neighboring pixels and an equation to be used are defined differently for each prediction mode. The table below lists intra-prediction mode numbers and names thereof.

For efficient directional prediction for a rectangular-shaped current block, directional modes (intra-prediction modes 67 to 80 and −1 to −14) indicated by dotted arrows in FIG. 3B may be additionally used. These modes may be referred to as "wide angle intra-prediction modes". In FIG. 3B, arrows indicate corresponding reference samples used for prediction, not indicating prediction directions. The prediction direction is opposite to the direction indicated by an arrow. A wide-angle intra prediction mode is a mode in which prediction is performed in a direction opposite to a specific directional mode without additional bit transmission when the current block has a rectangular shape.

In particular, among the wide angle intra-prediction modes, some wide angle intra-prediction modes available for the current block may be determined based on a ratio of the width and height of the rectangular current block. For example, wide angle intra-prediction modes with an angle less than about 45 degrees (intra prediction modes 67 to 80) may be used when the current block has a rectangular shape with a height less than the width thereof. Wide angle intra-prediction modes with an angle greater than about −135 degrees (intra-prediction modes −1 to −14) may be used when the current block has a rectangular shape with height greater than the width thereof.

The intra-predictor 122 may be configured to determine an intra-prediction mode to be used in encoding the current block. In some examples, the intra-predictor 122 may be configured to encode the current block using several intra-prediction modes and select an appropriate intra-prediction mode to use from the tested modes. For example, the intra-predictor 122 may be configured to calculate rate distortion values using rate-distortion analysis of several tested intra-prediction modes, and may be configured to select an intra-prediction mode that has the best rate distortion characteristics among the tested modes. The intra-predictor 122 is configured to select one intra-prediction mode from among the plurality of intra-prediction modes, and predict the current block using neighboring pixels (reference pixels) and an equation determined according to the selected intra-prediction mode. Information about the selected intra-prediction mode is encoded by the entropy encoder 155 and transmitted to the video decoding apparatus.

The inter-predictor 124 is configured to generate a prediction block for the current block through motion compensation. The inter-predictor 124 is configured to search for a block most similar to the current block in a reference picture which has been encoded and decoded earlier than the current picture, and generate a prediction block for the current block using the searched block. Then, the inter-predictor is configured to generate a motion vector corresponding to a displacement between the current block in the current picture and the prediction block in the reference picture. In general, motion estimation is performed on a luma component, and a motion vector calculated based on the luma component is used for both the luma component and the chroma component. The motion information including information about the reference picture and information about the motion vector used to predict the current block is encoded by the entropy encoder 155 and transmitted to the video decoding apparatus.

The predictor 120 may further use an intra block copy (IBC) mode. In the IBC mode, the predictor 120 is configured to search for a prediction block in the same frame or picture as the current block as in the intra prediction mode. However, the predictor 120 may usually search a wider search range including neighboring rows and columns of pixels. In the IBC mode, the predictor 120 may be configured to determine a block vector (referred to as a motion vector) to identify a prediction block in the same frame or picture as the current block. The block vector includes an x-component and a y-component, wherein the x-component identifies the horizontal displacement between the current block subjected to prediction and the prediction block, and the y-component identifies the vertical displacement between the current block subjected to prediction and the prediction block. The determined block vector is signaled in a bitstream such that the video decoding apparatus may identify the same prediction block as selected by the video encoding apparatus.

The video encoding apparatus may be configured to perform palette-based encoding on the current block and decode the encoded current block, using a palette-based coding technique, which will be described later. Accordingly, the video encoding apparatus may further include, for example, a palette-based encoder as a module of the predictor 120. The subtractor 130 is configured to subtract the prediction block generated by the intra-predictor 122 or the inter-predictor 124 from the current block to generate a residual block.

The transformer 140 may be configured to split the residual block into one or more transform blocks, and apply the transformation to the one or more transform blocks, thereby transforming the residual values of the transform blocks from the pixel domain to the frequency domain. In the frequency domain, the transformed blocks are referred to as coefficient blocks containing one or more transform coefficient values. A two-dimensional transform kernel may be used for transformation, and one-dimensional transform kernels may be used for horizontal transformation and vertical transformation, respectively. The transform kernels may be based on a discrete cosine transform (DCT), a discrete sine transform (DST), or the like.

The transformer 140 may be configured to transform residual signals in the residual block using the entire size of the residual block as a transformation unit. In addition, as will described later with reference to FIG. 5, the transformer 140 may be configured to partition the residual block into two sub-blocks in a horizontal or vertical direction, and transform only one of the two sub-blocks. Accordingly, the size of the transform block may be different from the size of the residual block (and thus the size of the prediction block). Non-zero residual sample values may not be present or may be very rare in the untransformed subblock. The residual samples of the untransformed subblock are not signaled, and may be regarded as "0" by the video decoding apparatus.

There may be multiple partition types according to the partitioning direction and partitioning ratio. The transformer 140 may provide information about the coding mode (or transform mode) of the residual block (e.g., information indicating whether the residual block is transformed or the residual subblock is transformed, and information indicating the partition type selected to partition the residual block into subblocks, and information identifying a subblock that is transformed is performed) to the entropy encoder 155. The entropy encoder 155 may be configured to encode the information about the coding mode (or transform mode) of the residual block. The quantizer 145 is configured to quantize transform coefficients output from the transformer 140, and output the quantized transform coefficients to the entropy encoder 155. For some blocks or frames, the quantizer 145 may be configured to directly quantize an associated residual block without transformation.

The rearrangement unit 150 may be configured to reorganize the coefficient values for the quantized residual value. The rearrangement unit 150 may be configured to change the 2-dimensional array of coefficients into a 1-dimensional coefficient sequence through coefficient scanninG For example, the rearrangement unit 150 may be configured to scan coefficients from a DC coefficient to a coefficient in a high frequency region using a zig-zag scan or a diagonal scan to output a 1-dimensional coefficient sequence. Depending on the size of the transformation unit and the intra-prediction mode, a vertical scan, in which a two-dimensional array of coefficients is scanned in a column direction, or a horizontal scan, in which two-dimensional block-shaped coefficients are scanned in a row direction, may be used instead of the zig-zag scan. In other words, a scan mode to be used may be determined among the zig-zag scan, the diagonal scan, the vertical scan and the horizontal scan according to the size of the transformation unit and the intra-prediction mode.

The entropy encoder 155 is configured to encode the one-dimensional quantized transform coefficients output from the rearrangement unit 150 using uses various encoding techniques such as Context-based Adaptive Binary Arithmetic Code (CABAC) and exponential Golomb, to generate a bitstream. The entropy encoder 155 is configured to encode information such as a CTU size, a CU split flag, a QT split flag, an MTT splitting type, and an MTT splitting direction, which are associated with block splitting, such that the video decoding apparatus may split the block in the same manner as in the video encoding apparatus. In addition, the entropy encoder 155 is configured to encode information about a prediction type indicating whether the current block is encoded by intra-prediction or inter-prediction, and encode intra-prediction information (i.e., information about an intra-prediction mode) or inter-prediction information (information about a reference picture index and a motion vector) according to the prediction type.

The inverse quantizer 160 is configured to inversely quantize the quantized transform coefficients output from the quantizer 145 to generate transform coefficients. The inverse transformer 165 is configured to transform the transform coefficients output from the inverse quantizer 160 from the frequency domain to the spatial domain and reconstructs the residual block. The adder 170 is configured to add the reconstructed residual block to the prediction block generated by the predictor 120 to reconstruct the current block. The pixels in the reconstructed current block are used as reference pixels in performing intra-prediction of a next block.

The filter unit 180 is configured to filter the reconstructed pixels to reduce blocking artifacts, ringing artifacts, and blurring artifacts generated due to block-based prediction and transformation/quantization. The filter unit 180 may include a deblocking filter 182 and a pixel adaptive offset (SAO) filter 184. The deblocking filter 180 is configured to filter the boundary between the reconstructed blocks to remove blocking artifacts caused by block-by-block coding/decoding, and the SAO filter 184 is configured to perform additional filtering on the deblocking-filtered video. The SAO filter 184 is a filter used to compensate for a difference between a reconstructed pixel and an original pixel caused by lossy coding.

The reconstructed blocks filtered through the deblocking filter 182 and the SAO filter 184 are stored in the memory 190. Once all blocks in one picture are reconstructed, the reconstructed picture may be used as a reference picture for inter-prediction of blocks in a picture to be encoded next. When deblocking is performed, deblocking filtering is not applied to a palette-coded block on one side of the block boundary.

Figure 4:
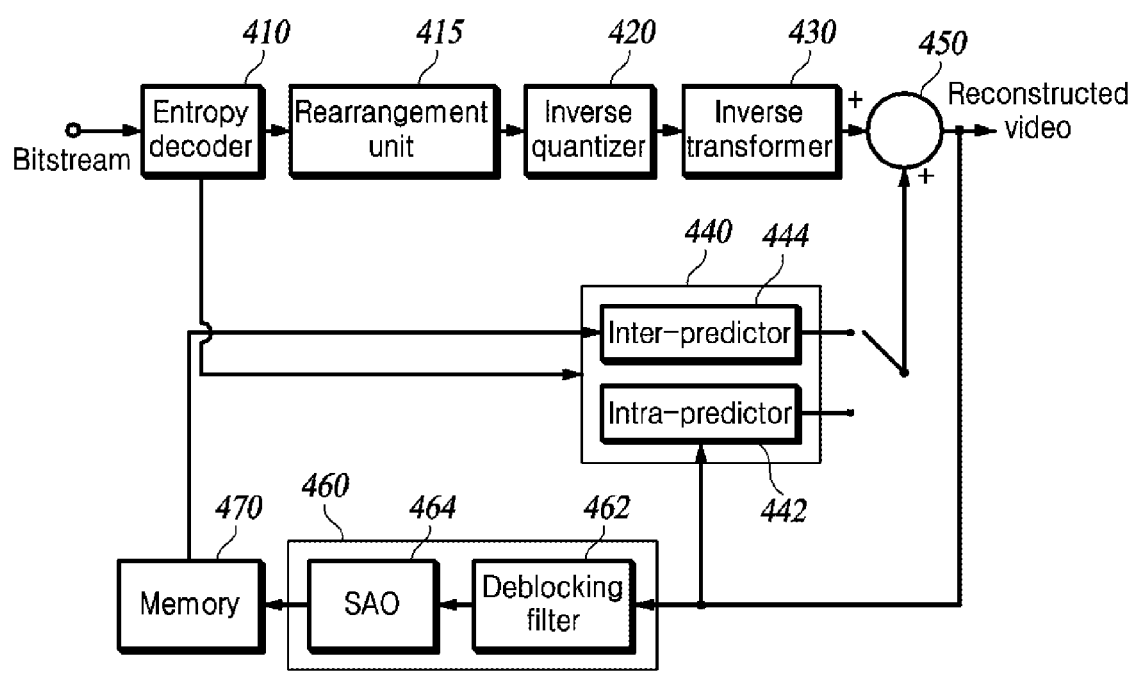
FIG. 4 is an exemplary block diagram of a video decoding apparatus capable of implementing the techniques of the present disclosure.

FIG. 4 is an exemplary functional block diagram of a video decoding apparatus capable of implementing the techniques of the present disclosure. Hereinafter, the video decoding apparatus and elements of the apparatus will be described with reference to FIG. 4. The video decoding apparatus may include an entropy decoder 410, a rearrangement unit 415, an inverse quantizer 420, an inverse transformer 430, a predictor 440, an adder 450, a filter unit 460, and a memory 470.

Similar to the video encoding apparatus of FIG. 1, each element of the video decoding apparatus may be implemented in hardware, software, or a combination of hardware and software. Further, the function of each element may be implemented in software, and the microprocessor may be implemented to execute the function of software corresponding to each element. The entropy decoder 410 is configured to determine a current block to be decoded by decoding a bitstream generated by the video encoding apparatus and extract information related to block splitting, and extracts prediction information and information about a residual signal, and the like required to reconstruct the current block.

The entropy decoder 410 is configured to extract information about the CTU size from the sequence parameter set (SPS) or the picture parameter set (PPS), determine the size of the CTU, and split a picture into CTUs of the determined size. Then, the decoder is configured to determine the CTU as the uppermost layer, that is, the root node of a tree structure, and extract splitting information about the CTU to split the CTU using the tree structure.

For example, when the CTU is split using a QTBTTT structure, a first flag (QT_split_flag) related to splitting of the QT is extracted to split each node into four nodes of a sub-layer. For a node corresponding to the leaf node of the QT, the second flag (MTT_split_flag) and information about a splitting direction (vertical/horizontal) and/or a splitting type (binary/ternary) related to the splitting of the MTT are extracted to split the corresponding leaf node in the MTT structure. Thereby, each node below the leaf node of QT is recursively split in a BT or TT structure.

As another example, when a CTU is split using the QTBTTT structure, a CU split flag (split_cu_flag) indicating whether to split a CU may be extracted. When the corresponding block is split, the first flag (QT_split_flag) may be extracted. In the splitting operation, zero or more recursive MTT splitting may occur for each node after zero or more recursive QT splitting. For example, the CTU may directly undergo MTT splitting without the QT splitting, or undergo only QT splitting multiple times.

As another example, when the cru is split using the QTBT structure, the first flag (QT_split_flag) related to QT splitting is extracted, and each node is split into four nodes of a lower layer. Then, a split flag (split_flag) indicating whether a node corresponding to a leaf node of QT is further split in the BT and the splitting direction information are extracted.

Once the current block to be decoded is determined through splitting in the tree structure, the entropy decoder 410 is configured to extract information about a prediction type indicating whether the current block is intra-predicted or inter-predicted. When the prediction type information indicates intra-prediction, the entropy decoder 410 is configured to extract a syntax element for the intra-prediction information (intra-prediction mode) for the current block. When the prediction type information indicates inter-prediction, the entropy decoder 410 is configured to extract a syntax element for the inter-prediction information, that is, information indicating a motion vector and a reference picture referred to by the motion vector.

The entropy decoder 410 is configured to extract information about the coding mode of the residual block (e.g., information about whether the residual block is encoded or only a subblock of the residual block is encoded, information indicating the partition type selected to partition the residual block into subblocks, information identifying the encoded residual subblock, quantization parameters, etc.) from the bitstream. The entropy decoder 410 is also configured to extract information about quantized transform coefficients of the current block as information about the residual signal.

The rearrangement unit 415 may be configured to change the sequence of the one-dimensional quantized transform coefficients entropy-decoded by the entropy decoder 410 to a 2-dimensional coefficient array (i.e., block) in a reverse order of the coefficient scanning performed by the video encoding apparatus. The inverse quantizer 420 is configured to inversely quantize the quantized transform coefficients. The inverse transformer 430 is configured to inversely transform the inversely quantized transform coefficients from the frequency domain to the spatial domain based on information about the coding mode of the residual block to reconstruct residual signals, thereby generating a reconstructed residual block for the current block When the information about the coding mode of the residual block indicates that the residual block of the current block has been coded by the video encoding apparatus, the inverse transformer 430 uses the size of the current block (and thus the size of the residual block to be reconstructed) as a transform unit for the inverse quantized transform coefficients to perform inverse transform to generate a reconstructed residual block for the current block. When the information about the coding mode of the residual block indicates that only one subblock of the residual block has been coded by the video encoding apparatus, the inverse transformer 430 uses the size of the transformed subblock as a transform unit for the inverse quantized transform coefficients to perform inverse transform to reconstruct the residual signals for the transformed subblock, and fills the residual signals for the untransformed subblock with a value of "0" to generate a reconstructed residual block for the current block.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction. The intra-predictor 442 is configured to determine an intra-prediction mode of the current block among a plurality of intra-prediction modes based on the syntax element for the intra-prediction mode extracted from the entropy decoder 410, and predict the current block using the reference pixels around the current block according to the intra-prediction mode.

The inter-predictor 444 is configured to determine a motion vector of the current block and a reference picture referred to by the motion vector using the syntax element for the intra-prediction mode extracted from the entropy decoder 410, and predict the current block based on the motion vector and the reference picture. The predictor 440 may further use an intra block copy (IBC) mode. The predictor 440 may use a block vector decoded from a bitstream by the entropy decoder 410 to identify the same prediction block as selected by the video encoding apparatus.

The video decoding apparatus may be configured to reconstruct the current block by performing palette-based decoding on the current block using a palette-based coding technique, which will be described later. The video decoding apparatus may further include, for example, a palette-based decoder as a module of the predictor 440. The adder 450 is configured to reconstruct the current block by adding the residual block output from the inverse transformer and the prediction block output from the inter-predictor or the intra-predictor. The pixels in the reconstructed current block are used as reference pixels in intra-predicting a block to be decoded next.

The filter unit 460 may include a deblocking filter 462 and an SAO filter 464. The deblocking filter 462 deblocking-filters the boundary between the reconstructed blocks to remove blocking artifacts caused by block-by-block decoding. The SAO filter 464 is configured to perform additional filtering on the reconstructed block after deblocking filtering to corresponding offsets to compensate for a difference between the reconstructed pixel and the original pixel caused by lossy coding. The reconstructed block filtered through the deblocking filter 462 and the SAO filter 464 is stored in the memory 470. When all blocks in one picture are reconstructed, the reconstructed picture is used as a reference picture for inter-prediction of blocks in a picture to be encoded next. When deblocking is performed, deblocking filtering may not be applied to a block decoded in the palette mode on one side of the block boundary.

The techniques of the present disclosure generally are related to intra-prediction coding. The following description is mainly focused on decoding techniques, that is, the operation of the video decoding apparatus. The encoding techniques are briefly described because they are opposite to the decoding techniques that are comprehensively described.

One aspect of the present disclosure relates to improving parallel coding of blocks of video data. Various video coding standards including the High Efficiency Video Coding (HEVC) support parallel processing mechanisms, such as a virtual pipeline data unit (VPDU), tiles, and wavefront parallel processing (WPP), to allow different blocks in the same picture to be decoded simultaneously.

From the perspective of hardware implementation of the decoder, the decoder may be designed to perform parallel processing by configuring several pipelines for the decoding process. In particular, a data unit input to or output from each pipeline is referred to as a virtual pipeline data unit (VPDU). The size of the VPDU is determined by the maximum transform block (TB) size. For the other blocks such as prediction blocks, a given block may be divided into any small blocks to be operated. However, for the transform block, this method cannot be applied. In the current discussion about VVC standardization, a transform of the size up to 64×64 is used for the luma component, and thus the hardware-implemented decoder may use pipelines operating at the size of a 64×64 block. Tiles provide partitioning for dividing a picture into a plurality of independently decodable rectangular regions such that the video decoding apparatus may decode multiple tiles in parallel.

In WPP, each row of CTUs in a picture is referred to as a "wavefront". Unlike the tiles, wavefronts are not independently decodable, but the video decoder may decode several wavefronts in parallel by sequentially delaying the time points at which the several wavefronts starts to be decoded. For example, when the video decoder uses WPP to decode a picture, the video decoder is configured to decode two consecutive CTUs of a first wavefront, and then start decoding a second wavefront below the first wavefront. Accordingly, it may be ensured that any information on the first wavefront required for decoding of the second wavefront is available at the time when the second wavefront is decoded. The time for which the video decoder needs to wait after start of decoding of the N−1-th CTU row until the N-th CTU row is decoded may be referred to as a delay. In the WPP structure of HEVC, each CTU row is processed using a delay of two consecutive CTUs based on the upper CTU row. To mitigate the potential loss of coding efficiency due to conventional CABAC initialization at the beginning of each CTU row, CABAC context information is propagated from the second CTU of the preceding CTU row (i.e., upper right CTU) to the first CTU of the current CTU row in WPP.

While the maximum CTU size in HEVC is 64×64, the maximum CTU size has been increased to 128×128 in the discussion of VVC standardization. Accordingly, the parallel processing capability that the WPP architecture with a 2-CTU delay may provide a substantial decrease. In the WPP mode, as the delay between CTU rows is reduced, the parallel processing performance increases. However, the search range for the pixel reference in intra prediction and the block vector in the intra block copy (IBC) is restricted, and coding efficiency decreases due to the relatively less updated CABAC context information being propagated to the first CTU of the next wavefront. In other words, in the WPP structure, there is a trade-off between coding efficiency and parallel processing performance.

Figure 5:
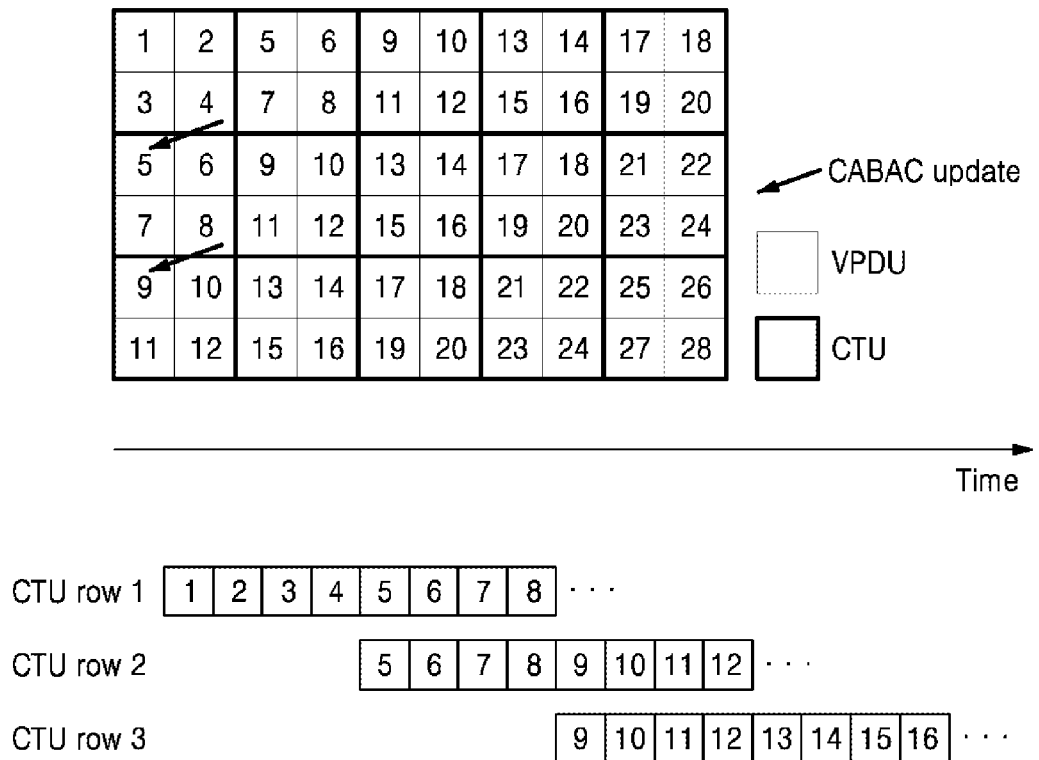
FIG. 5 is a conceptual diagram illustrating a wavefront parallel encoding and decoding scheme of a 1-CTU (4-VPDU) delay structure according to an aspect of the present disclosure.

According to an aspect of the present disclosure, an improved WPP structure that may minimize degradation of coding efficiency while having a shorter waiting time than the 2-CTU delay structure of HEVC is proposed. For example, a WPP structure of a 1-CTU (4-VPDU) delay may be considered. FIG. 5 is a conceptual diagram illustrating a wavefront parallel encoding and decoding scheme of a 1-CTU (4-VPDU) delay structure according to an aspect of the present disclosure. According to the proposed 1-CTU (4-VPDU) delay WPP structure, the pipeline delay of WPP is reduced from 2 CTUs to 4 VPDUs (1 CTU) compared to the HEVC framework. The CABAC context information of the block corresponding to the first VPDU of each CTU row may be updated with the CABAC context information from the bottom-right VPDU in the first CTU of the preceding CTU row that has already been decoded. This 1-CTU (4-VPDU) delay structure has higher parallelism than the 2-CTU delay structure of the HEVC framework, but a restriction should be imposed on a block vector for intra block copy (or intra line copy) and the pixel reference for intra prediction of the above-right block.

As another example, a 1.5-CTU (6-VPDU) delay WPP structure may be considered. FIG. 6 is a conceptual diagram illustrating a wavefront parallel encoding and decoding scheme of a 1.5-CTU (6-VPDU) delay structure according to an aspect of the present disclosure. According to the proposed 1.5-CTU (6-VPDU) delay structure, the restrictions on the pixel reference for intra prediction and the block vector for IBC are relaxed compared to those on the 1-CTU (4-VPDU) delay structure. More efficient encoding and decoding may be implemented by setting CABAC context information of the first CTU of each CTU row using more updated CABAC context information than the 1-CTU (4-VPDU) delay structure.

Referring to FIG. 6, in the 1.5-CTU (6-VPDU) delay structure, the CABAC context information of the block corresponding to the first VPDU in each CTU row is updated with CABAC context information from the top-right VPDU in the second CTU in the preceding CTU row that has already been decoded. The example of FIG. 6 is a case where the size of the VPDU=N and the size of the CTU=2N. In particular, pixel reference to the left side, above-left side, above side and above-right side for ultra prediction may be allowed. In addition, the use of a block vector for IBC (or intra line copy) to these sides may be allowed. When the size of the current block (CU) is greater than the size of the VPDU, a restriction may be imposed on the intra prediction mode or the IBC mode.

FIGS. 7A-7B are diagrams illustrating a restriction imposed on an intra prediction mode or an intra block copy mode when a current block is greater than the size of a VPDU in the 1.5-CTU (6-VPDU) delay structure. In FIGS. 7A-7B, O/X marked in the VPDU indicates the availability of the VPDU in coding the current block. As shown in FIG. 7A, when the current CU is larger than the size of the VPDU, reference pixels included in the X-marked VPDUs on the above-right side are unavailable. In particular, by filling the unavailable reference pixels with the value of the rightmost pixel among the available above reference pixels, use of the intra prediction mode referring to the pixels on the above-right side in the intra prediction of the current CU may be allowed.

When the prediction mode of the current CU is IBC (or intra line copy), the use of block vectors directed to blocks corresponding to the two VPDUs on the lower side in the above-right CTU is restricted. Accordingly, the video encoder may be configured to exclude blocks corresponding to the two VPDUs on the lower side in the above-right CTU from the motion search region for IBC. In addition, when a block vector pointing to the above-right side indicating blocks corresponding to the two top VPDUs in the above-right CTU is selected, the video encoder may signal a block vector whose magnitude is equal to a magnitude obtained by subtracting an offset of an unavailable magnitude from the block vector (or may signal a block vector scaled by half). When the video decoder decodes the block vector pointing in the above-right direction from the bitstream, it may reconstruct the original block vector by adding the offset to the decoded block vector.

Similarly, as shown in FIG. 7B, when the current CU is greater than the size of the VPDU, reference samples included in the X-marked VPDU on the above-right side are unavailable. In particular, by filling the unavailable reference pixels with the rightmost pixel value among the available above reference pixels, the use of the intra prediction mode referring to the pixel on the above-right side may be allowed in the intra prediction of the current CU.

In some embodiments, when the size of the CTU is less than or equal to the size of the VPDU (i.e., the size of the CTU<=the size of the VPDU), the video encoder and decoder may be configured to perform encoding and decoding through a WPP structure having a 2-CTU delay rather than a 1.5-CTU delay. Accordingly, the encoder and decoder may be configured to initialize the CABAC context information of the first CTU in the current cru row, using the CABAC context information of the above-right CTU. In particular, separate signaling such as a flag indicating that the coding is performed in the WPP structure with the 2-CTU delay may not be required.

Typically, the video encoder and decoder may be configured to determine whether to apply WPP on a sequence-by-sequence basis. In some embodiments, whether to apply WPP may be determined in a unit of a picture subgroup (which may be, for example, a subpicture, a slice, a tile, or a CTU group). The video encoder may signal a flag (e.g., wpp_eriable_flag) related to whether or not WPP is applied in each of the aforementioned units, and the video decoder may determine whether to perform WPP in each unit by parsing the flag from the bitstream. In some cases, when the width of a picture subgroup to be encoded or decoded is less than a predetermined specific width (e.g., "(Width of subgroup/width of CTU)<threshold"), the video encoder and video decoder may not apply the WPP to the subgroup. Accordingly, in this case, encoding and decoding of the WPP flag is skipped, and the video decoder may implicitly disable the WPP.

When a picture is divided into a plurality of subgroups to be encoded and decoded, dependency between subgroups may be controlled at a higher level or a subgroup level. Possibility of such dependency may be signaled through one or more syntax elements at a higher level, or may be signaled through a flag for each subgroup. For example, the picture may be encoded such that any of the subgroups (e.g., CTU groups, tiles, tile groups, slices, subpictures, etc.) of the picture does not have dependency, or may be encoded such that only some subgroups have no dependency.

Accordingly, a subgroup in the picture may be decoded independently from (or in parallel with) other subgroups, and some subgroups may be decoded depending on the information about another subgroup that has already been decoded. In particular, initializing the CABAC context information of the first CTU of the current subgroup using the CABAC context information of the CTU of another subgroup previously encoded and decoded may provide a gain for encoding efficiency.

Figure 8:
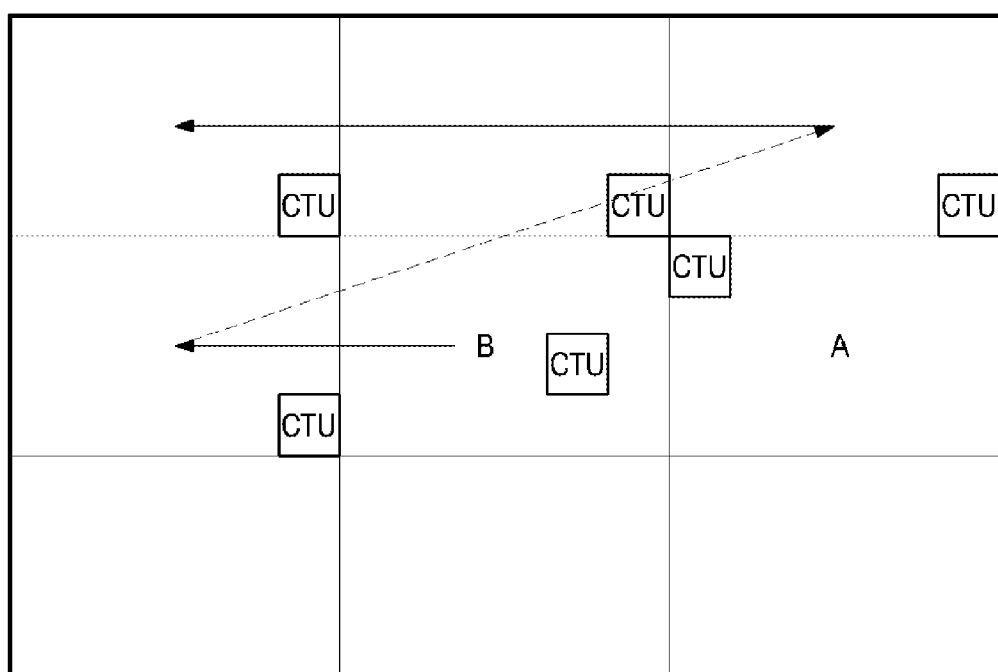
FIG. 8 illustrates a picture divided into a plurality of subgroups.

FIG. 8 illustrates a picture divided into a plurality of subgroups. In FIG. 8, it is assumed that subgroup A is a subgroup that is unable to be independently decoded, and that some of the other subgroups can be decoded independently (or in parallel). Whether respective subgroups are independently decoded (or sequentially decoded) may be signaled in a bitstream by the encoder through a flag. To initialize the CABAC context information of the first CTU of subgroup A, the encoder and decoder may be configured to search for preceding subgroups in reverse order of the Z-scan order to check whether there is a subgroup that has already been encoded and decoded.

The encoder and decoder may be configured to initialize the context information of the current CTU based on the CABAC context information of the last CTU of a subgroup coded before coding of the first CTU of subgroup A. For example, when subgroup A and subgroup B, which is a preceding subgroup adjacent to subgroup A, are encoded such that the two subgroups are sequentially decoded (i.e., subgroup B is a subgroup that cannot be independently decoded), the decoder may initialize the context information of the first CTU of subgroup A with the CABAC context information of the last decoded CTU of subgroup B.

Figure 9:
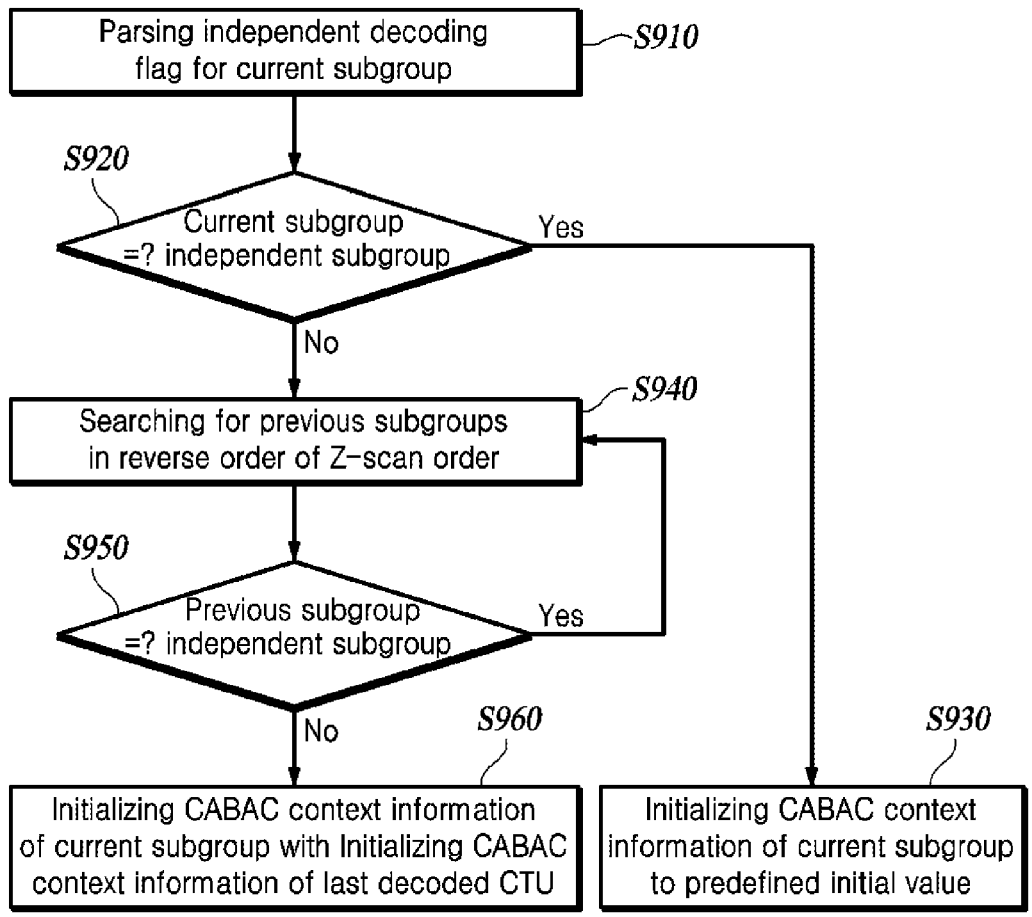
FIG. 9 is a flowchart illustrating a method of initializing CABAC context information of a first CTU of a subgroup in a picture by a video decoder according to an aspect of the present disclosure.

FIG. 9 is a flowchart illustrating a method of initializing CABAC context information of a first CTU of a subgroup in a picture by a video decoder according to an aspect of the present disclosure. The video decoder may parse a flag from a bitstream and thereby determine whether a current subgroup is a subgroup that can be independently decoded (S910 to S920).

When the current subgroup is not a subgroup that may be independently decoded ("No" in S920), a preceding subgroup that is unable to be independently decoded may be searched for in the reverse order of the Z-scanning order among preceding subgroups (S940). When the preceding subgroup that is unable to be independently decoded is found ("No" in S950), the video decoder may be configured to set CABAC context information of the first CTU (VPDU) of the current subgroup using the CABAC context information of the last decoded CTU (or VPDU) in the found subgroup (S960).

When the current subgroup is a subgroup that may be independently decoded ("Yes" in S920), context information of the first CTU (or VPDU) of the current subgroup may be initialized to a preset value (e.g., 0 or 0.5) (S930). In some embodiments, information (e.g., a specific value or table and/or index) for initialization of CABAC context information of the first CTU (or VPDU) of a subgroup that may be decoded independently (or in parallel) may be signaled in a bitstream by the encoder.

Hereinafter, techniques for palette-based coding of video data proposed in the present disclosure will be described.

A. Initialization and Generation of Pallet Table

In palette-based video coding, a video encoder and a video decoder each derives a palette table (simply referred to as a "palette") for a block of pixels. Each entry in the palette table contains values of color components (e.g., RGB, YUV, or the like) or luma component value identified by index. As part of coding of a block in a palette mode, the video encoder and decoder first determine a palette table to be used for the block. Then, the respective palette indices for pixels (or samples) of the block may be coded to indicate which entry in the palette should be used to predict or reconstruct a pixel (sample).

Initializing a palette prediction list (also referred to as a palette predictor) generally refers to a process of generating a palette prediction list for the first block of a group (e.g., subpicture, slice or tile, etc.) of video blocks. The palette prediction list for subsequent blocks is typically generated by updating the previously used palette prediction list. In other words, after coding a given block in the palette mode, the encoder and decoder each updates the palette prediction list using the current palette. Entries used in the current palette are added to a new palette prediction list, and entries in the previous palette prediction list that are not used in the current palette may be added at a position after the new entries of the new palette prediction list until the maximum allowed size of the palette prediction list is reached. However, in the case of the first block, since the previously used palette prediction list is not available, the palette prediction list for the first block is initialized to 0 in the prior art. Thus, the entries in the palette table for the first block are new entries explicitly signaled by the encoder.

The present disclosure proposes a technique for efficiently generating or initializing a palette table for a block that is encoded/decoded first in a group (e.g., picture, slice, tile, etc.) of video blocks. According to an aspect of the present disclosure, a video encoder may signal a default palette table having a plurality of palette colors in a high level (such as picture parameter set (PPS), sequence parameter set (SPS), adaptation parameter set (APS), slice header, etc.)). The default palette table may be used to generate (i.e., initialize) a palette table for palette coding in a low level (i.e., a block level) when a previously configured palette prediction list is not available.

Based on the default palette table signaled in the high level, the video decoder may be configured to determine the entries of the palette table for the first block of the low level. The palette table for the first block of the low level may be referred to as "initial palette table" or "initial palette". For example, in generating an initial palette table, a binary flag may be signaled for each entry of the default palette table to indicate which of the entries in the default palette table should be used for initialization of the palette table. The binary flag set to "1" may indicate that the related entry is used for the initial palette, and the binary flag set to "0" may indicate that the associated entry is not used for the initial palette. A string of binary flags may be referred to as an index vector. The index vector may be transmitted using run-length coding (of bins of 0 or 1). The video decoder may configure a palette table for palette decoding of the first CU by parsing the default palette table signaled in the high level and an index vector signaled in the low level.

Figure 10:
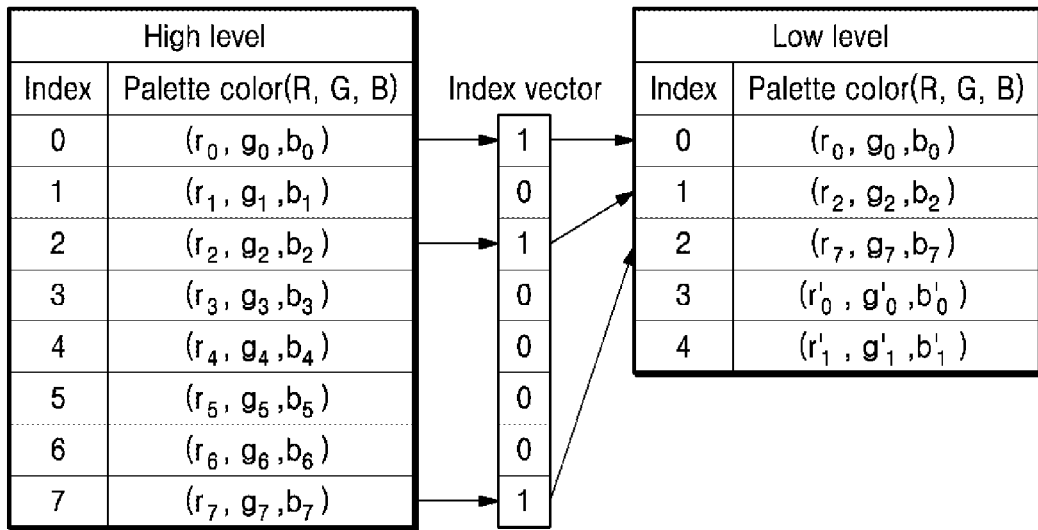
FIG. 10 is a conceptual diagram illustrating an example of initializing a palette for coding video data according to an aspect of the present disclosure.

FIG. 10 is a conceptual diagram illustrating an example of initializing a palette for coding video data according to an aspect of the present disclosure. In the example of FIG. 10, the default palette table signaled in the high level has 8 entries. The index vector indicates that the first entry, the third entry, and the eighth entry (i.e., entries mapped to indices 0, 2, and 7) of the default palette table are included in the initial palette table of the sub-unit, and the remaining entries (i.e., the entries mapped to indices 1 and 3 to 6) are not included in the initial palette table.

In some cases, the number of entries re-used from the default palette table may be signaled in the high level or the low level. In addition, the size of an initial palette table to be used in the low level (i.e., the maximum number of entries) may be signaled. In some cases, an initial palette table of a fixed size may be used, and thus signaling about the size of the initial palette table to be used in the low level may not be required.

The palette for coding the current block may also contain one or more new palette entries that are explicitly coded (for example, separately from the index vector). In the initial palette table exemplarily shows in FIG. 10, (r', g', b') corresponding to indices 3 and 4 is not palette entries of the high level, but new entries explicitly signaled in the low level by the encoder. When all entries of the initial palette table are filled by using the index vector, coding of syntax elements indicating new palette entries (i.e., color values) may be skipped. In some cases, a flag indicating the presence or absence of new palette entries may be coded.

In the case of slices using a dual tree in which CU partitioning differs between luma and chroma components, respective palettes for each color components (e.g., Y palette, Cb palette, Cr palette) may be used, or two palettes (e.g., Y palette, Cb/Cr palette) may be used. In the case of a single tree, a single palette in which values of all color components (Y, Cb, Cr) are included in each entry may be used. In the case of monochrome, a single palette may be used.

B. Initialization of Pallet Table when WIT is Enabled

When wavefront parallel processing (WPP) is enabled, the palette table may need to be initialized at the first CTU (or VPDU) of each CTU row for parallel processing. In particular, the palette prediction list for the first CTU (or VPDU) of the current CTU row may be initialized using the palette data of a decoded CTU or VPDU located above the current CTU row.

Figure 11:
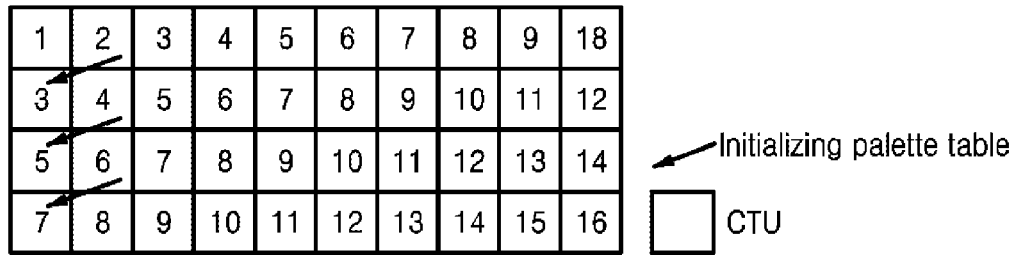
FIG. 11 illustrates initialization of a palette table when 2-CTU delay WPP is enabled according to an aspect of the present disclosure.
Figure 12:
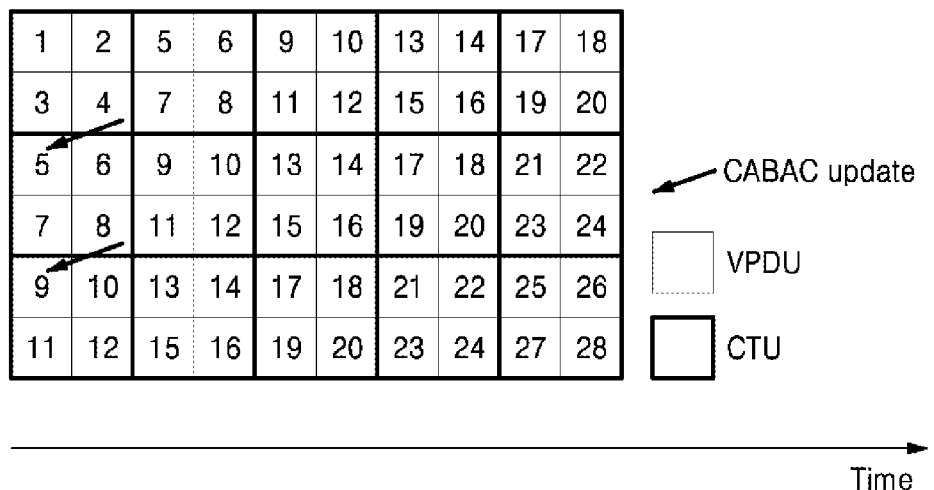
FIG. 12 illustrates initialization of a palette table when 1-CTU delay WPP is enabled according to an aspect of the present disclosure.

As an example, as shown in FIG. 11, when 2-CTU delay WPP is used, a palette prediction list of the above-right CTU of the current CTU that has already been decoded may be retrieved from the previous CTU row to initialize the palette prediction list for configuration of the palette table of the first CTU of the current CTU row. As another example, as shown in FIG. 12, when 4-VPDU delay WPP (i.e., 1-CTU delay WPP) is used, the palette prediction list of a VPDU (i.e., the above CTU of the current CTU) that has already been decoded in the previous CTU row may be used to initialize the palette prediction list for configuration of the palette table of the first CTU in the current CTU row.

In some embodiments, the palette prediction list of the CTU that has already been decoded in the above CTU row may be used as a palette prediction list of the first CTU of the current CTU row. In particular, the palette table of the first CTU in the current CTU row may be configured using the palette prediction list through signaling of an index vector and signaling of additional color component values, similar to the method illustrated in FIG. 10. In some other embodiments, the palette table of the above CTU (in the case of 1-CTU delay WPP) or the above-right CTU (in the case of 1-CTU delay WPP) that has already been decoded may be used as a palette table of the first CTU of the current CTU row. Samples that do not have color values expressed in the palette for coding of a block.

The encoder and decoder each may be configured to code and/or determine a flag (which may be referred to as a block-level escape flag) indicating whether any sample of a block is coded in an escape mode, which will be described below. For example, a flag value "0" may indicate that no samples of the block are coded using the escape mode. In other words, values of all samples of the block may be determined based on color values included in the palette for coding the block. A flag value "1" may indicate that at least one sample of the block is coded using the escape mode. In other words, the value of at least one sample is coded as an escape sample.

In some examples, a CU level escape flag indicating whether the current CU has an escape sample may be signaled in a bitstream. The presence of the escape sample in the CU may affect the number of palette indices for the CU. For example, the palette of the CU generated from the palette prediction list may have N entry indices such that, for example, an entry index for a sample can be selected from $\{0, 1, \ldots, N-1\}$. When the CU-level escape flag indicates that an escape sample is present in the current block, the encoder and decoder may be configured to add an index (not associated with any entry) to the palette for the current block to ensure that the possible index values in the current block may be $\{0, 1, \ldots, N-1, N\}$. In particular, an index equal to N (also referred to as an escape index) indicates that the associated sample is an escape sample. Each of indices less than N may indicate that the associated sample is represented in color(s) from the palette associated with the index.

C. Palette Index Scanning Order

A 2D block of palette indices for each pixels (samples) in a CU is referred to as a palette index map. The video encoder may be configured to transform the 2D block of palette indices into a 1D array by scanning the palette indices based on a scanning order. Similarly, the video decoder may be configured to reconstruct the block of palette indices based on the scanning order. The previous sample refers to a sample that precedes the currently coded sample in the scanning order.

Figure 13A:
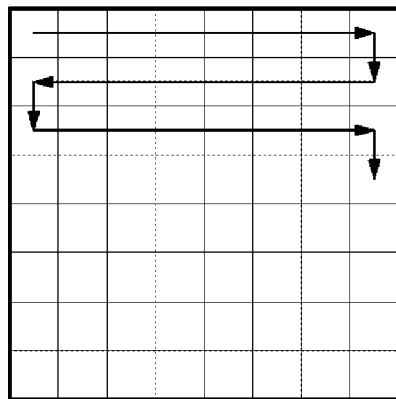
FIGS. 13A-13D are diagrams illustrating scanning sequences for coding a palette index map according to an aspect of the present disclosure.
Figure 13B:
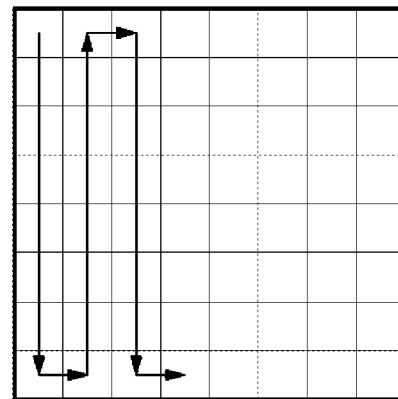

In some embodiments, in order to scan palette indices of a given CU, the horizontal traverse scanning order illustrated in FIG. 13A and the vertical traverse scanning order illustrated in FIG. 13B may be selectively used. In some other embodiment, a horizontal scanning order and a vertical scanning order may be selectively used. The encoder may signal a flag indicating the selected scanning order for a given CU. In some other embodiments, a diagonal scanning order illustrated in FIG. 13C or a zigzag scanning order illustrated in FIG. 13D may be used to scan palette indices of a given CU.

D. Coding of Palette Index

Each sample in a block coded in a palette-based coding mode may be coded using one of two index coding modes disclosed below. COPY_ABOVE mode: In this mode, the palette index for the current sample is copied from a sample at the same position from the previous line (upper row or left column) in the scanning order in the block.

INDEX mode: In this mode, the palette index is explicitly signaled in a bitstream using a syntax element, expressed as, for example, truncated binary code by the encoder or is inferred by the decoder. The INDEX mode includes a first INDEX mode, in which the palette index of a previous sample position preceding in the scan order is copied, that is, the palette index for the current sample is inferred by the decoder, and a second INDEX mode, in which the palette index is explicitly signaled.

In order to efficiently code the palette index of the current sample, the encoder and decoder may use the index coding mode of the previous sample of the current sample and/or the index coding mode of a sample at the same position as the current sample (i.e., the upper sample or the left sample) in the previous line as CABAC context information for the current sample.

In the palette index coding scheme proposed in the present disclosure, one or two flags for determining an index coding mode are parsed for each sample position in a block. For each sample position, a first flag set to 0 or 1 is parsed, and a second flag set to 0 or 1 is parsed depending at least in part on the value of the first flag. One of the COPY-_ABOVE mode, the first INDEX mode, and the second INDEX mode is determined according to a value derived from the one or more flags parsed for each sample position. The palette index for the pixel position is signaled by the encoder and parsed by the decoder only when the determined mode is the second INDEX mode. In other words, in the present disclosure, the video decoder configures a block map representing index coding modes allocated to each pixel position in a block according to the one or two flags, and determines a palette index for each pixel position in accordance with the block map.

In some embodiments, in which the scanning orders illustrated in FIGS. 13A and 13B may be selectively used, a first flag (e.g., run_copy_flag) indicating whether the current sample is in the same index coding mode as the previous sample (namely, whether the index coding modes of the current sample and the previous sample are both COPY_ABOVE mode, or both the current sample and the previous sample have the same index in the INDEX mode) is coded for each sample in the current block. When the value of the first flag is 0 and the previous sample is in the INDEX mode, a second flag (e.g., copy_above_palette_indices_flag) indicating whether the index coding mode of the current sample is INDEX or COPY_ABOVE may be additionally coded. In addition, a variable Copy_Above_Flag indicating the index coding mode of the sample is introduced.

Table 1 shows how the palette index of the associated sample is determined according to the values of the syntax element run_copy_flag and the variable Copy_Above_Flag.

TABLE 1

| run_copy_flag | Copy_Above_Flag | Palette Index |
| --- | --- | --- |
| 0 | 0 | Explicitly Signaled |
| 0 | 1 | Above Copy |
| 1 | 0 | Previous Copy |
| 1 | 1 | Above Copy |

Figure 14:
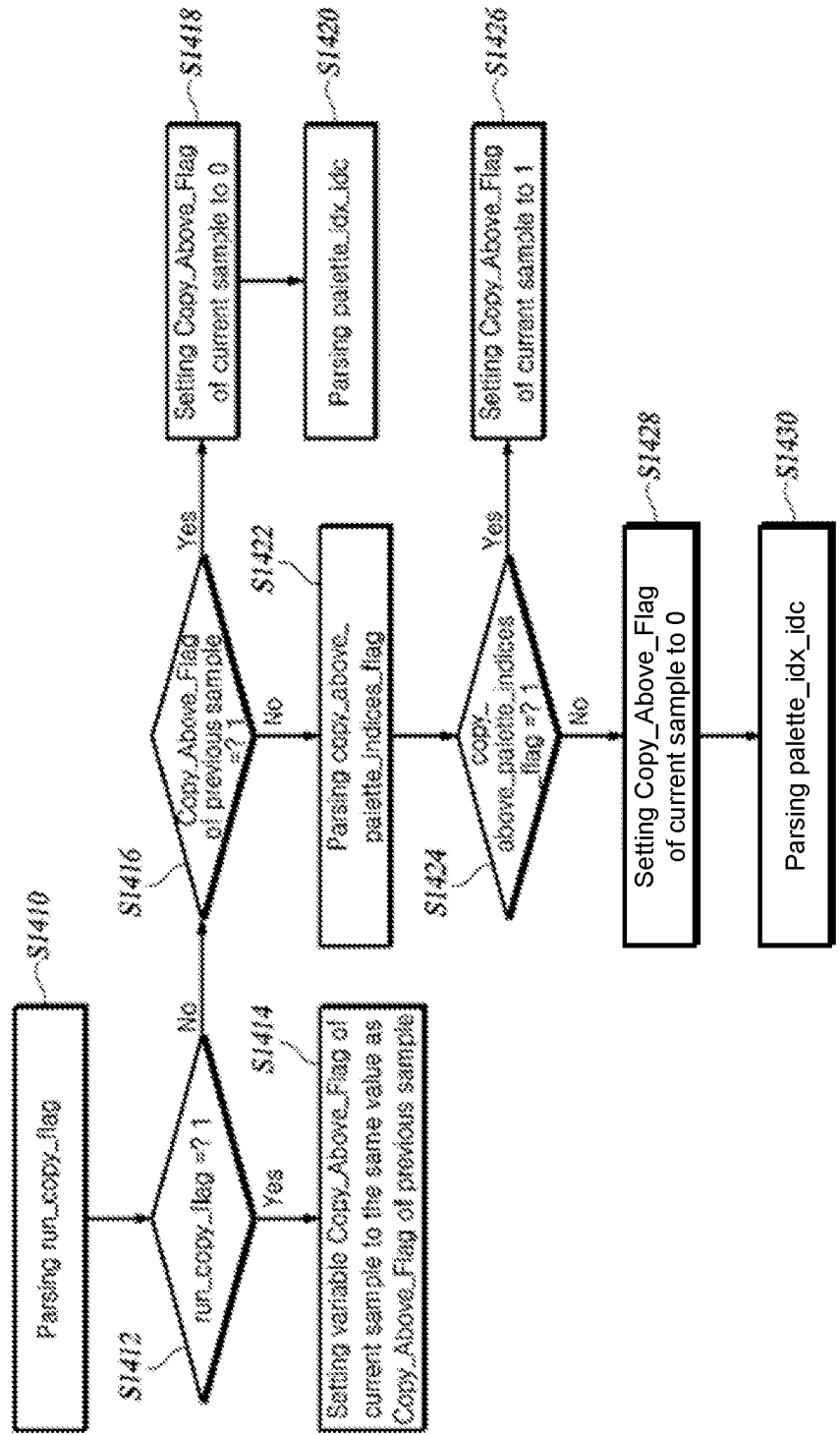
FIG. 14 is a flowchart illustrating a method of determining a palette index for a current pixel by a decoder according to an aspect of the present disclosure.

FIG. 14 is a flowchart illustrating a method of determining a palette index for a current sample by a decoder according to an aspect of the present disclosure. Referring to FIG. 14, the decoder may parse the first flag (e.g., run_copy_flag) indicating whether the current sample is in the same index coding mode as the previous sample (namely, whether the index coding modes of the current sample and the previous sample are both COPY_ABOVE mode, or both the current sample and the previous sample have the same index in the INDEX mode) (S1611).

When the value of a first flag (run_copy_flag) is 1 ("Yes" in S1412), the decoder sets Copy_Above_Flag of the current sample to the same value as Copy_Above_Flag of the previous sample (S1414). In other words, when Copy_Above_Flag of the previous sample is Copy_Above_Flag of the current sample is set to 0. Thus, referring to Table 1, the palette index of the current sample is copied from the previous sample. When Copy_Above_Flag of the previous sample is 1, Copy_Above_Flag of the current sample is set to 1. Thus, referring to Table 1, the palette index of the current sample is copied from the sample at the same position in the previous line (i.e., upper row or left column) (In other words, the palette index of the current sample is copied from the sample at the same position in the upper row for the horizontal transverse scanning in FIG. 13A, while the palette index of the current sample is copied from the sample at the same position in the left column for the vertical transverse scanning in FIG. 13B).

When the value of the first flag (run_copy_flag) is 0 ("No" in S1412), the decoder determines whether the value of Copy_Above_Flag of the previous sample is 1 (S1416). When the value of Copy_Above_Flag of the previous sample is 1 ("Yes" in S1416), the decoder sets Copy_Above_Flag of the current sample to 0 (S1418). Therefore, referring to Table 1, since run_copy_flag=0 and Copy_Above_Flag=0 for the current sample, the palette index of the current sample is explicitly signaled in the bitstream. The decoder parses a syntax element (palette_idx_idc) indicating the palette index of the current sample from the bitstream (S1420). When the value of Copy_Above_Flag of the previous sample is 0 ("Yes" in S1416), the decoder further parses the second flag (copy_above_palette_indices_flag) (S1422).

When copy_above_palette_indices_flag=1 ("Yes" in S1424), the decoder is configured to set Copy_Above_Flag of the current sample to 1 (S1426). Therefore, referring to Table 1, since run_copy_flag=0 and Copy_Above_Flag=1 for the current sample, the palette index of the current sample is copied from the sample at the same position in the previous line (upper row or left column) in the scan order. When copy_above_palette_indices_flag=0 ("No" in S1412), the decoder is configured to set Copy_Above_Flag of the current sample to 0 (S1428). Therefore, referring to Table 1, since run_copy_flag=0 and Copy_Above_Flag=0 for the current sample, the palette index of the current sample is explicitly signaled in the bitstream. The decoder parses a syntax element (palette_idx_idc) indicating the palette index of the current sample from the bitstream (S1430).

In particular, for samples located in the first row in FIG. 13A and the first column in FIG. 13B, there is no previous scan line, and the second flag (copy_above_palette_indices_flag) is not signaled, but is inferred as 0. That is, the index coding mode of each of the samples located in the first row in FIG. 13A and the first column in FIG. 13B is regarded as the INDEX mode by default. It should be understood that the encoder may also code the palette index for each sample of the block substantially in the same order as the order illustrated in FIG. 14.

The encoder and decoder may be configured to perform the above-described palette index coding by dividing the one-dimensional array of palette indices into sample groups of a predefined size (e.g., 16 samples). When palette index coding for one sample group is finished, palette index coding for the next sample group may be started. In addition, in the palette index coding for one sample group, the first flag (run_copy_flag) and the second flag (copy_above_palette_indices_flag) may be coded, and then a syntax element (palette_idx_idc) for required samples may be coded.

Figure 15:
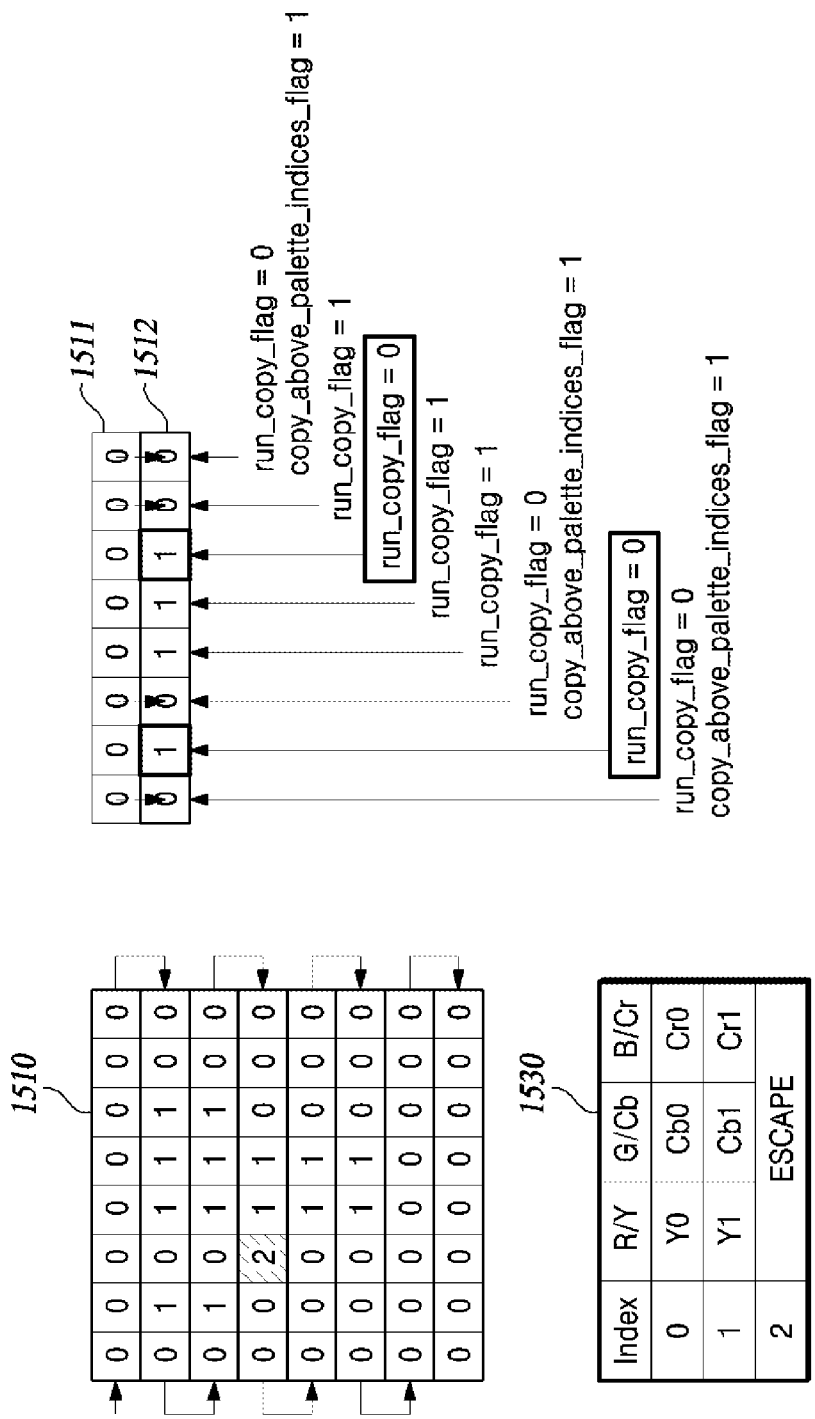
FIG. 15 is a conceptual diagram illustrating a method of coding a palette index map according to an aspect of the present disclosure.

FIG. 15 is a conceptual diagram illustrating a method of coding a palette index map according to an aspect of the present disclosure. In FIG. 15, a palette index map 1510 for an 8×8 coding block is illustrated, and it is assumed that the horizontal transverse scanning order is used to scan the palette indices. The palette table 1530 has two entries associated with indices 0 and 1, and has index 3 as an escape index for escape samples. In right part of FIG. values of the first flag (run_copy_flag) and the second flag (copy_above_palette_indices_flag) signaled for the palette indices in the second row 1512 of the palette index map 1510 are shown. The two samples indicated in bold in the second row 1512 represent samples of which a syntax element (palette_idx_idc) explicitly indicating an associated palette index is coded.

As described above, the INDEX mode is used for all samples of the first row 1511 in the illustrated palette index map 1510, and all the samples in the illustrated index map 1510 have a palette index 0. In addition, as described above, since the INDEX mode is used for all samples of the first row 1511 in the given index map, the variable Copy_Above_Flag is set to 0 for the last sample (the rightmost sample) of the first row 1511. For the first sample in the scanning order (i.e., rightmost sample) in the second row 1512, the last sample (rightmost sample) of the first row 1511 is a previous sample, and is also a sample at the same position on the previous line. In the illustrated palette index map 1510, the palette index ("0") of the first sample in the scan order in the second row 1512 is the same as that of the previous sample and is also the same as that of the sample at the same position on the previous line. Therefore, the encoder may select, between INDEX mode and COPY_ABOVE mode, an index coding mode to use to code the palette index of the first sample in the scanning order in the second row 1512. The selection may be based on R/D testing.

When the encoder codes the palette index of the first sample in the second row 1512 in the scan order in the COPY_ABOVE mode, run_copy_flag set to 0 is signaled for the first sample in the second row 1512, and copy_above_palette_indices_flag set to 1 is additionally signaled. The decoder parses run_copy_flag, and additionally parses copy_above_palette_indices_flag because run_copy_flag=0 and Copy_Above_Flag of the previous sample (that is, the sample of the first row 1511) is 0. Since copy_above_palette_indices_flag=1, the decoder is configured to set Copy_Above_Flag for the current sample to 1. In addition, since run_copy_flag=0 and Copy_Above_Flag=1 for the current sample, the decoder may be configured to determine (infer) the index coding mode of the current sample as Above Copy. In other words, the palette index of the first sample in the second row 1512 is copied from the sample at the same position in the first row, which is the previous line.

In the second row 1512, the palette index ("0") of the second sample in the scan order is the same as that of a previous sample and is also the same as that of a sample at the same position in the previous line. Accordingly, the encoder may be configured to select an index coding mode to use for coding of the palette index of the second sample in the second row 1512 between the INDEX mode and the COPY_ABOVE mode. This selection may be based on RID testing. When the COPY_ABOVE mode is selected, the second sample and the previous sample (first sample) in scan order in the second row 1512 are commonly in the COPY_ABOVE mode. Accordingly, the encoder signals run_copy_flag set to 1 for the first sample in the second row 1512. The decoder parses run_copy_flag for the current sample (i.e., the second sample in the second row 1512), and sets the Copy_Above_Flag of the current sample to the same value (i.e., 1) as the previous sample because run_copy_flag=1. Since run_copy_flag=0 and Copy_Above_Flag=1 for the current sample, the decoder may be configured to determine (infer) the index coding mode of the current sample (that is, the second sample of the second row 1512) as Above Copy.

In the second row 1512, the palette index ("1") of the third sample in the scan order is different from the palette index ("1") of the previous sample, and is also different from the palette index ("1") of the above sample. Accordingly, the encoder is configured to select the index coding mode of the third sample as the INDEX mode. Since the index coding modes of the second sample and the third sample are different, run_copy_flag set to 0 is signaled, and Copy_Above_Flag of the third sample is set to 0 because Copy_Above_Flag=1 for the second sample, which is a previous sample. Since run_copy_flag=0 and Copy_Above_Flag=0 for the third sample, the encoder additionally signals a syntax element (palette_idx_idc) specifying the palette index value ("1") of the third sample.

The remaining samples in the second row are processed in a similar manner, and detailed descriptions thereof are skipped. In some other embodiments, in which the scanning order illustrated in FIG. 13C or FIG. 13D may be used, a flag (e.g., index_pred_flag) indicating whether the palette index of the current sample is predicted (copied) from the palette index of the left or above sample (i.e., whether the palette index of the current sample is the same as the palette index of the left or above sample) may be coded. Particularly, index_pred_flag=1 may indicate that the palette index of the current sample is predicted (copied) from the palette index of the left or above sample, and index_pred_flag=0 may indicate that the palette index of the current sample is not predicted (copied).

Figure 13C:
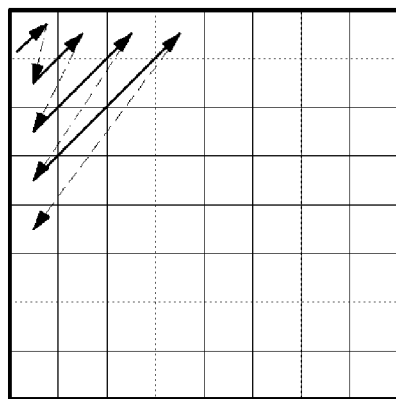
Figure 13D:
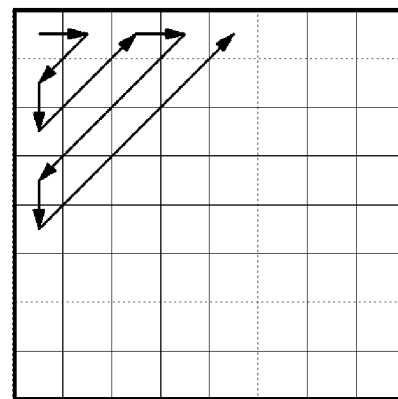

When index_pred_flag=1, a flag (left_or_above_flag) indicating whether the palette index of the current sample is the same as the palette index of the left sample or the palette index of the above sample may be additionally coded. Left_or_above_flag=0 may indicate that the palette index of the current sample is the same as the palette index of the left sample, and left_or_above_flag=1 may indicate that the palette index of the current sample is the same as the palette index of the above sample. In FIG. 13C or FIG. 13D, index_pred_flag=0 may be inferred for the uppermost-left sample of the current block, and left_or_top_flag may be inferred as 1 for the samples of the leftmost column except the uppermost-left sample. Particularly, left_or_top_flag may be inferred as 0 for the samples in the uppermost column.

For samples whose associated palette index is not predicted (i.e., index_pred_flag=0) from the palette index of their left or above sample, the value of the associated palette index is explicitly signaled in a bitstream by the encoder, using, for example, using a syntax element expressed as a truncated binary code. As described above, to indicate that a specific sample value of a block is coded as an escape sample (e.g., a sample that does not have one of color values represented in the palette for coding of the block), the encoder and decoder may code data representing the last index (i.e., escape index) in the palette whose index has been incremented by 1. For example, when the index for the sample to be decoded is equal to the escape index (e.g., the last index in the above-mentioned palette), the decoder may infer the sample as an escape sample. When the index map is determined, the encoder and the decoder may be configured to reconstruct the current block by determining color components corresponding to the palette index of each sample with reference to the palette table for the current block.

E. Predicting the Sample Value of the Escape Sample

Typically, for the escape sample whose sample value is not included as a palette entry in the palette, a quantized sample value may be explicitly signaled in the bitstream for all color components by the encoder. According to the present disclosure, for an escape sample whose sample value is not included as a palette entry in the palette, the sample value may be predicted, from a neighboring block is already decoded, in the non-directional mode (DC, Planar, etc.) or the directional mode, which is similar to the intra-predicted sample.

For example, for an escape sample, the encoder may be configured to calculate the RD-cost for explicit signaling of a quantized sample value and prediction from a neighboring block and determine whether to explicitly signal the quantized sample value. In addition, the encoder may be configured to signal a 1-bit flag indicating whether the quantized sample value for the escape sample is explicitly signaled in the bitstream. The decoder may be configured to parse the 1-bit flag, and thereby determine whether to decode the quantized sample value from the bitstream for the escape sample or to predict the sample value of the escape sample from a neighboring block that has already been decoded.

As another example, the encoder and decoder each may be configured to always predict an escape sample from a neighboring block that has already been decoded. In particular, signaling of the aforementioned 1-bit flag is not required. The encoder may signal a syntax element indicating the mode number of the ultra prediction mode selected for the escape pixel. Alternatively, when one preset intra prediction mode is commonly used for the escape pixels, signaling of the syntax element indicating the mode number may not be required.

Meanwhile, after coding the current CU, the palette prediction list is updated using the palette table for the current CU. Entries used in the current palette are added to the new palette prediction list. Subsequently, entries from the previous palette prediction list that have been not used in the current palette are added to the new palette prediction list until the maximum allowed size of the palette prediction list is reached.

Figure 16:
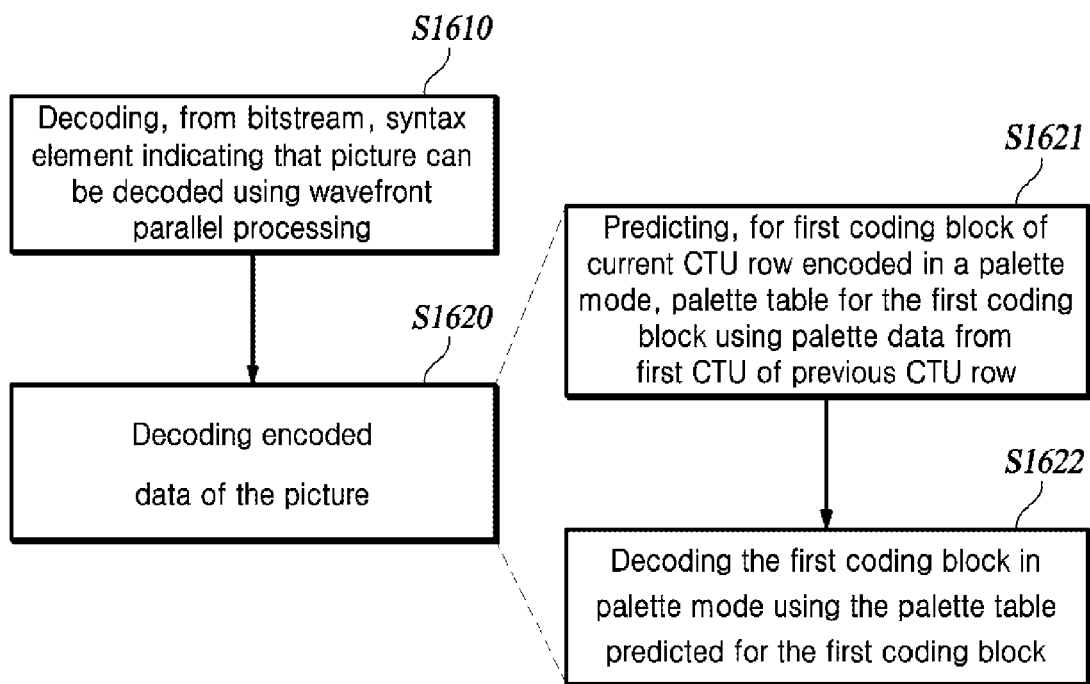
FIG. 16 is a flowchart illustrating a method of decoding video data according to an aspect of the present disclosure.

FIG. 16 is a flowchart illustrating a method of decoding video data by a decoder according to an aspect of the present disclosure. In operation S1610, the decoder decodes, from a bitstream, a syntax element indicating that a picture may be decoded using wavefront parallel processing (WPP). The syntax element may be signaled at a sequence parameter set (SPS) level.

In operation S1620, the decoder is configured to decode the encoded data of the picture. The decoder may use WPP to decode the encoded data of the picture. For example, the decoder may be configured to decode a plurality of CTU rows in parallel in a manner in which decoding of the first CTU of each CTU row is started after the first CTU of the previous CTU row has been decoded. Additionally, WPP may be performed on a per slice basis or a per tile basis. In addition, even when a picture is coded such that it may be decoded using WPP, decoding of a plurality of CTU rows in parallel is not necessarily required for the coded data of the picture. Thus, the decoder may not decode multiple CTU rows in parallel. Even in this case, the decoding of the first CTU of each CTU row can be started after the first CTU of the previous CTU row has been decoded.

As part of decoding the coded data of the picture (S1620), the decoder may, for the first coding block of the current CTU row to be decoded in the palette mode, predict a palette table for the first coding block using the palette data from the first CTU of the previous CTU row (S1621). In addition, the decoder may be configured to decode the first coding block in the palette mode based on the predicted palette table for the first coding block (S1622). As part of predicting the palette table for the first coding block (S1621), the decoder may be configured to determine whether to reuse one or more entries of the palette data from the first CTU of the previous CTU row in the palette table for the first coding block. Additionally, the decoder may be configured to determine new entries to be added to the palette table for the first coding block.

As part of decoding the first coding block of the current CTU row in the palette mode (S1622), the decoder may decode, from the bitstream, an escape flag indicating whether one or more escape samples are present in the first coding block. When the escape flag indicates that at least one escape sample is present in the first coding block, the decoder may be configured to add an additional index to the predicted palette table for the first coding block. The decoder may be configured to decode at least one syntax element from the bitstream for each sample of the first coding block in order to reconstruct a palette index map for the first coding block. Furthermore, the encoder may be configured to identify one or more escape samples having an additional index based on the reconstructed palette index map, and decode, from the bitstream, syntax elements representing quantized color component values for the identified escape samples.

The at least one syntax element that is decoded to reconstruct the palette index map of the coding block includes a first flag (e.g., run_copy_flag) indicating whether the associated sample is in the same index coding mode as the previous sample preceding in the scanning order. The first flag may be decoded for each sample of the coding block. The at least one syntax element further includes a second flag (e.g., copy_above_palette_indices_flag) indicating whether the palette index of the associated sample is copied from the sample at the same position in the previous line in the scanning order.

The second flag may be decoded when the first flag indicates that the associated sample is not in the same index coding mode as the previous sample, and the index coding mode of the previous sample is the INDEX mode. Additionally, the decoding of the second flag may be omitted for samples located in the first row of the coding block for the horizontal transverse scanning order and samples located in the first column of the coding block for the vertical transverse scanning order. The at least one syntax element further includes a syntax element (e.g., palette_idx_idc) explicitly expressing a palette index of an associated sample. The syntax element explicitly expressing the palette index may be decoded when first flag indicates that the associated sample is not in the same index coding mode as the previous sample, and the index coding mode of the associated sample is not the COPY ABOVE mode.

It should be understood that the encoder may also be configured to perform encoding of video data substantially in the same manner as in the order illustrated in FIG. 16. For example, the encoder may be configured to encode a syntax element indicating that a picture of video data can be decoded using wavefront parallel processing (WPP), and encode data of the picture so that the decoder may decode it using WPP. As part of encoding the data of the picture, for the first coding block of the current CTU row to be encoded in the palette mode, the encoder may be configured to predict the palette table for the first coding block using the palette data from the first CTU of the previous CTU row, and encode the first coding block in the palette mode using the predicted palette table for the first coding block.

It should be understood that the exemplary embodiments described above may be implemented in many different ways. The functions or methods described in one or more examples may be implemented in hardware, software, firmware, or any combination thereof. It should be understood that the functional components described herein have been labeled "unit" to further emphasize their implementation independence.

Various functions or methods described in the present disclosure may be implemented with instructions stored in a non-transitory recording medium that may be read and executed by one or more processors. Non-transitory recording media include, for example, all types of recording devices in which data is stored in a form readable by a computer system. For example, non-transitory recording media include storage media such as erasable programmable read only memory (EPROM), flash drives, optical drives, magnetic hard drives, and solid state drives (SSDs).

Although exemplary embodiments of the present invention have been described for illustrative purposes, those skilled in the art will appreciate that and various modifications and changes are possible, without departing from the idea and scope of the invention. Exemplary embodiments have been described for the sake of brevity and clarity. Accordingly, one of ordinary skill would understand that the scope of the embodiments is not limited by the embodiments explicitly described above but is inclusive of the claims and equivalents thereto.

What is claimed is:

1. An apparatus for decoding video data, comprising:
means for decoding, from a bitstream, a syntax element indicating that a picture is capable of being decoded using wavefront parallel processing; and
means for decoding encoded data of the picture,
wherein, when the data of the picture is decoded by using the wavefront parallel processing, a plurality of coding tree unit (CTU) rows of the picture are decoded in parallel by starting decoding of a first CTU of a current CTU row after a first CTU of a previous CTU row has been decoded, and
wherein the decoding of the encoded data of the picture includes:
predicting, for a first coding block of the current CTU row encoded in a palette mode, a palette table for the first coding block using palette data from the first CTU of a previous CTU row; and
decoding the first coding block in the palette mode using the palette table predicted for the first coding block;
wherein the decoding of the first coding block of the current CTU row in the palette mode includes:
decoding, from the bitstream, an escape flag indicating whether one or more escape samples are present in the first coding block;
when the escape flag indicates that at least one escape sample is present in the first coding block, adding an additional index to the predicted palette table for the first coding block;
decoding, from the bitstream, at least one syntax element for each sample of the first coding block to reconstruct a palette index map for the first coding block;
identifying one or more escape samples having the additional index based on the reconstructed palette index map; and
decoding, from the bitstream, syntax elements representing quantized color component values for the identified escape samples, and
wherein the at least one syntax element for each sample of the first coding block includes:
a first flag indicating whether an index coding mode of an associated sample is the same as an index coding mode of a previous sample preceding in a scanning order, the first flag being decoded for each sample of the first coding block;
a second flag indicating whether a palette index of the associated sample is copied from a sample at the same position in a previous line in the scanning order, wherein the second flag is decoded when it is indicated by the first flag that the associated sample is not in the same index coding mode as the previous sample, and an index coding mode of the previous sample is an INDEX mode; and a syntax element explicitly expressing the palette index of the associated sample, wherein the syntax element explicitly expressing the palette index is decoded when it is indicated by the first flag that the associated sample is not in the same index coding mode as the previous sample, and the index coding mode of the associated sample is not a COPY ABOVE mode.

2. A non-transitory computer readable medium storing a bitstream containing encoded data for a block of video data, the bitstream being generated by processes of:

encoding a syntax element indicating that a picture is capable of being decoded using wavefront parallel processing; and encoding data of the picture to enable decoding using the wavefront parallel processing in which a plurality of CTU rows of the picture are decoded in parallel by starting decoding of a first CTU of a current CTU row after a first CTU of a previous CTU row has been decoded, wherein the encoding of the data of the picture includes:
predicting, for a first coding block of the current CTU row encoded in a palette mode, a palette table for the first coding block using palette data from the first CTU of the previous CTU row; and encoding the first coding block in the palette mode using the palette table predicted for the first coding block, and wherein the encoding of the first coding block in the palette mode includes:
encoding, into a bitstream, an escape flag indicating whether one or more escape samples are present in the first coding block;

when the escape flag indicates that at least one escape sample is present in the first coding block, adding an additional index to the predicted palette table for the first coding block;

encoding, into the bitstream, at least one syntax element for each sample of the first coding block to specify a palette index map for the first coding block;

identifying one or more escape samples having the additional index based on the reconstructed palette index map; and encoding, into the bitstream, syntax elements representing quantized color component values for the identified escape samples, and wherein the at least one syntax element for each sample of the first coding block includes:
a first flag indicating whether an index coding mode of an associated sample is the same as an index coding mode of a previous sample preceding in a scanning order, the first flag being encoded for each sample of the first coding block;

a second flag indicating whether a palette index of the associated sample is copied from a sample at the same position in a previous line in the scanning order, wherein the second flag is encoded when it is indicated by the first flag that the associated sample is not in the same index coding mode as the previous sample, and an index coding mode of the previous sample is an INDEX mode; and a syntax element explicitly expressing the palette index of the associated sample, wherein the syntax element explicitly expressing the palette index is encoded when it is indicated by the first flag that the associated sample is not in the same index coding mode as the previous sample, and the index coding mode of the associated sample is not a COPY ABOVE mode.

3. An apparatus for encoding video data, comprising:
means for encoding a syntax element indicating that a picture is capable of being decoded using wavefront parallel processing; and means for encoding data of the picture to enable decoding using the wavefront parallel processing in which a plurality of CTU rows of the picture are decoded in parallel by starting decoding of a first CTU of a current CTU row after a first CTU of a previous CTU row has been decoded, wherein the encoding of the data of the picture includes:
predicting, for a first coding block of the current CTU row encoded in a palette mode, a palette table for the first coding block using palette data from the first CTU of the previous CTU row; and encoding the first coding block in the palette mode using the palette table predicted for the first coding block, and wherein the encoding of the first coding block in the palette mode includes:
encoding, into a bitstream, an escape flag indicating whether one or more escape samples are present in the first coding block;

when the escape flag indicates that at least one escape sample is present in the first coding block, adding an additional index to the predicted palette table for the first coding block;

encoding, into the bitstream, at least one syntax element for each sample of the first coding block to specify a palette index map for the first coding block;

identifying one or more escape samples having the additional index based on the reconstructed palette index map; and encoding, into the bitstream, syntax elements representing quantized color component values for the identified escape samples, and wherein the at least one syntax element for each sample of the first coding block includes:
a first flag indicating whether an index coding mode of an associated sample is the same as an index coding mode of a previous sample preceding in a scanning order, the first flag being encoded for each sample of the first coding block;

a second flag indicating whether a palette index of the associated sample is copied from a sample at the same position in a previous line in the scanning order, wherein the second flag is encoded when it is indicated by the first flag that the associated sample is not in the same index coding mode as the previous sample, and an index coding mode of the previous sample is an INDEX mode; and a syntax element explicitly expressing the palette index of the associated sample, wherein the syntax element explicitly expressing the palette index is encoded when it is indicated by the first flag that the associated sample is not in the same index coding mode as the previous sample, and the index coding mode of the associated sample is not a COPY ABOVE mode.

* * * * *